US010817795B2

(12) United States Patent
Kaifosh et al.

(10) Patent No.: US 10,817,795 B2
(45) Date of Patent: Oct. 27, 2020

(54) HANDSTATE RECONSTRUCTION BASED ON MULTIPLE INPUTS

(71) Applicant: Facebook Technologies, LLC, Menlo Park, CA (US)

(72) Inventors: Patrick Kaifosh, New York, NY (US); Tudor Giurgica-Tiron, Stanford, CA (US); Brett Jurman, New York, NY (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/257,922

(22) Filed: Jan. 25, 2019

(65) Prior Publication Data

US 2019/0228330 A1   Jul. 25, 2019

Related U.S. Application Data

(60) Provisional application No. 62/621,818, filed on Jan. 25, 2018.

(51) Int. Cl.
*G06N 7/00* (2006.01)
*G06N 20/10* (2019.01)
(Continued)

(52) U.S. Cl.
CPC .......... *G06N 7/005* (2013.01); *G06F 3/014* (2013.01); *G06F 3/015* (2013.01); *G06F 3/017* (2013.01);
(Continued)

(58) Field of Classification Search
CPC ........ G06N 7/005; G06N 20/10; G06F 3/015; G06F 3/014; G06F 3/017; G06T 19/20
See application file for complete search history.

(56) References Cited

U.S. PATENT DOCUMENTS 4,896,120 A   1/1990  Kamil
5,625,577 A   4/1997  Kunii et al.
(Continued)

FOREIGN PATENT DOCUMENTS

CA   2902045 A1   8/2014
CA   2921954 A1   2/2015
(Continued)

OTHER PUBLICATIONS

Arkenbout, Ewout A. et al., "Robust Hand Motion Tracking through Data Fusion of 5DT Data Glove and Nimble VR Kinect Camera Measurements," Sensors 2015, 15, 31644-31671 (Year: 2015).*
(Continued)

*Primary Examiner* — Rehana Perveen
*Assistant Examiner* — Steven W Crabb
(74) *Attorney, Agent, or Firm* — FisherBroyles, LLP

(57) ABSTRACT

Methods and systems for dynamically reconstructing handstate information based on multiple inputs are described. The methods and systems use data from multiple inputs including a plurality of neuromuscular sensors arranged on one or more wearable devices and one or more cameras. The multimodal data is provided as input to a trained statistical model. The methods and systems determine, based on the data from the multiple inputs, an estimate and representation of the spatial relationship between two or more connected segments of the musculoskeletal representation and force information describing a force exerted by at least one segment of the musculoskeletal representation. The methods and systems further update the computerized musculoskeletal representation based, at least in part, on the position information and the force information.

29 Claims, 11 Drawing Sheets

(51) Int. Cl.
*G06F 3/01* (2006.01)
*G06T 19/20* (2011.01)
*G06F 3/03* (2006.01)

(52) U.S. Cl.
CPC ........... *G06F 3/0304* (2013.01); *G06N 20/10* (2019.01); *G06T 19/20* (2013.01)

(56) References Cited

U.S. PATENT DOCUMENTS

| | | | |
|---|---|---|---|
| 6,005,548 A | 12/1999 | Latypov et al. | |
| 6,009,210 A | 12/1999 | Kand | |
| 6,244,873 B1 | 6/2001 | Hill et al. | |
| 6,411,843 B1 | 6/2002 | Zarychta | |
| 6,658,287 B1 | 12/2003 | Litt et al. | |
| 6,720,984 B1 | 4/2004 | Jorgensen et al. | |
| 6,774,885 B1 | 8/2004 | Even-Zohar | |
| 6,942,621 B2 | 9/2005 | Avinash et al. | |
| 7,089,148 B1 | 8/2006 | Bachmann et al. | |
| 7,351,975 B2 | 4/2008 | Brady et al. | |
| 7,574,253 B2 | 8/2009 | Edney et al. | |
| 7,580,742 B2 | 8/2009 | Tan et al. | |
| 7,787,946 B2 | 8/2010 | Stahmann et al. | |
| 7,805,386 B2 | 9/2010 | Greer | |
| 7,901,368 B2 | 3/2011 | Flaherty et al. | |
| 8,170,656 B2 | 5/2012 | Tan et al. | |
| 8,190,249 B1 | 5/2012 | Gharieb et al. | |
| 8,311,623 B2 | 11/2012 | Sanger | |
| 8,351,651 B2 | 1/2013 | Lee | |
| 8,421,634 B2 | 4/2013 | Tan et al. | |
| 8,435,191 B2 | 5/2013 | Barboutis et al. | |
| 8,437,844 B2 | 5/2013 | Syed Momen et al. | |
| 8,447,704 B2 | 5/2013 | Tan et al. | |
| 8,484,022 B1 | 7/2013 | Vanhoucke | |
| 8,718,980 B2 | 5/2014 | Garudadri et al. | |
| 8,744,543 B2 | 6/2014 | Li et al. | |
| 8,754,862 B2 | 6/2014 | Zaliva | |
| D717,685 S | 11/2014 | Bailey et al. | |
| 8,880,163 B2 | 11/2014 | Barachant et al. | |
| 8,890,875 B2 | 11/2014 | Jammes et al. | |
| 8,892,479 B2 | 11/2014 | Tan et al. | |
| 9,037,530 B2 | 5/2015 | Tan et al. | |
| D742,272 S | 11/2015 | Bailey et al. | |
| 9,218,574 B2 | 12/2015 | Phillipps et al. | |
| 9,235,934 B2 | 1/2016 | Mandella et al. | |
| 9,240,069 B1 | 1/2016 | Li | |
| 9,278,453 B2 | 3/2016 | Assad | |
| 9,299,248 B2 | 3/2016 | Lake et al. | |
| D756,359 S | 5/2016 | Bailey et al. | |
| 9,367,139 B2 | 6/2016 | Ataee et al. | |
| 9,372,535 B2 | 6/2016 | Bailey et al. | |
| 9,389,694 B2 | 7/2016 | Ataee et al. | |
| 9,408,316 B2 | 8/2016 | Bailey et al. | |
| 9,459,697 B2 | 10/2016 | Bedikian et al. | |
| 9,483,123 B2 | 11/2016 | Aleem et al. | |
| 9,597,015 B2 | 3/2017 | McNames et al. | |
| 9,600,030 B2 | 3/2017 | Bailey et al. | |
| 9,612,661 B2 | 4/2017 | Wagner et al. | |
| 9,613,262 B2 | 4/2017 | Holz | |
| 9,659,403 B1 | 5/2017 | Horowitz | |
| 9,687,168 B2 | 6/2017 | John | |
| 9,696,795 B2 | 7/2017 | Marcolina et al. | |
| 9,720,515 B2 | 8/2017 | Wagner et al. | |
| 9,741,169 B1 | 8/2017 | Holz | |
| 9,766,709 B2 | 9/2017 | Holz | |
| 9,785,247 B1 | 10/2017 | Horowitz et al. | |
| 9,788,789 B2 | 10/2017 | Bailey | |
| 9,864,431 B2 | 1/2018 | Keskin et al. | |
| 9,867,548 B2 | 1/2018 | Le et al. | |
| 9,880,632 B2 | 1/2018 | Ataee et al. | |
| 9,891,718 B2 | 2/2018 | Connor | |
| 10,042,422 B2 | 8/2018 | Morun et al. | |
| 10,070,799 B2 | 9/2018 | Ang et al. | |
| 10,078,435 B2 | 9/2018 | Noel | |
| 10,101,809 B2 | 10/2018 | Morun et al. | |
| 10,152,082 B2 | 12/2018 | Bailey | |
| 10,188,309 B2 | 1/2019 | Morun et al. | |
| 10,199,008 B2 | 2/2019 | Aleem et al. | |
| 10,203,751 B2 | 2/2019 | Keskin et al. | |
| 10,216,274 B2 | 2/2019 | Chapeskie et al. | |
| 10,251,577 B2 | 4/2019 | Morun et al. | |
| 10,310,601 B2 | 6/2019 | Morun et al. | |
| 10,331,210 B2 | 6/2019 | Morun et al. | |
| 10,362,958 B2 | 7/2019 | Morun et al. | |
| 2003/0144829 A1 | 7/2003 | Geatz et al. | |
| 2003/0171921 A1 | 9/2003 | Manabe et al. | |
| 2003/0184544 A1 | 10/2003 | Prudent | |
| 2004/0092839 A1 | 5/2004 | Shin et al. | |
| 2007/0172797 A1 | 7/2007 | Hada et al. | |
| 2007/0256494 A1 | 11/2007 | Nakamura et al. | |
| 2007/0285399 A1 | 12/2007 | Lund | |
| 2008/0052643 A1 | 2/2008 | Ike et al. | |
| 2008/0214360 A1 | 9/2008 | Stirling et al. | |
| 2008/0221487 A1 | 9/2008 | Zohar et al. | |
| 2009/0082692 A1 | 3/2009 | Hale et al. | |
| 2009/0082701 A1 | 3/2009 | Zohar et al. | |
| 2009/0112080 A1 | 4/2009 | Matthews | |
| 2009/0326406 A1 | 12/2009 | Tan et al. | |
| 2009/0327171 A1 | 12/2009 | Tan et al. | |
| 2010/0030532 A1 | 2/2010 | Arora et al. | |
| 2010/0063794 A1 | 3/2010 | Hernandez-Rebollar | |
| 2010/0106044 A1 | 4/2010 | Linderman | |
| 2010/0280628 A1 | 11/2010 | Sankai | |
| 2010/0292617 A1 | 11/2010 | Lei et al. | |
| 2010/0293115 A1 | 11/2010 | Seyed Momen | |
| 2010/0315266 A1 | 12/2010 | Gunawardana et al. | |
| 2011/0077484 A1 | 3/2011 | Van Slyke et al. | |
| 2011/0092826 A1 | 4/2011 | Lee et al. | |
| 2012/0066163 A1 | 3/2012 | Balls et al. | |
| 2012/0188158 A1 | 7/2012 | Tan et al. | |
| 2012/0265480 A1 | 10/2012 | Oshima | |
| 2012/0283526 A1 | 11/2012 | Gommesen et al. | |
| 2013/0077820 A1 | 3/2013 | Marais et al. | |
| 2013/0141375 A1 | 6/2013 | Ludwig et al. | |
| 2013/0207889 A1 | 8/2013 | Chang et al. | |
| 2013/0217998 A1 | 8/2013 | Mahfouz et al. | |
| 2013/0232095 A1* | 9/2013 | Tan | G06F 3/015 706/12 |
| 2013/0317382 A1 | 11/2013 | Le | |
| 2013/0317648 A1 | 11/2013 | Assad | |
| 2014/0052150 A1 | 2/2014 | Taylor et al. | |
| 2014/0092009 A1 | 4/2014 | Yen et al. | |
| 2014/0098018 A1 | 4/2014 | Kim et al. | |
| 2014/0196131 A1 | 7/2014 | Lee | |
| 2014/0198034 A1 | 7/2014 | Bailey et al. | |
| 2014/0198035 A1 | 7/2014 | Bailey et al. | |
| 2014/0223462 A1 | 8/2014 | Aimone et al. | |
| 2014/0240103 A1 | 8/2014 | Lake et al. | |
| 2014/0240223 A1 | 8/2014 | Lake et al. | |
| 2014/0245200 A1 | 8/2014 | Holz | |
| 2014/0249397 A1 | 9/2014 | Lake et al. | |
| 2014/0278441 A1 | 9/2014 | Ton et al. | |
| 2014/0304665 A1 | 10/2014 | Holz | |
| 2014/0334083 A1 | 11/2014 | Bailey | |
| 2014/0344731 A1 | 11/2014 | Holz | |
| 2014/0355825 A1 | 12/2014 | Kim et al. | |
| 2014/0365163 A1 | 12/2014 | Jallon | |
| 2014/0376773 A1 | 12/2014 | Holz | |
| 2015/0006120 A1 | 1/2015 | Sett et al. | |
| 2015/0010203 A1 | 1/2015 | Muninder et al. | |
| 2015/0025355 A1 | 1/2015 | Bailey et al. | |
| 2015/0029092 A1 | 1/2015 | Holz et al. | |
| 2015/0035827 A1 | 2/2015 | Yamaoka et al. | |
| 2015/0045699 A1 | 2/2015 | Mokaya et al. | |
| 2015/0051470 A1 | 2/2015 | Bailey et al. | |
| 2015/0057770 A1 | 2/2015 | Bailey et al. | |
| 2015/0070270 A1 | 3/2015 | Bailey et al. | |
| 2015/0070274 A1 | 3/2015 | Morozov | |
| 2015/0084860 A1 | 3/2015 | Aleem et al. | |
| 2015/0109202 A1 | 4/2015 | Ataee et al. | |
| 2015/0124566 A1 | 5/2015 | Lake et al. | |
| 2015/0128094 A1 | 5/2015 | Baldwin et al. | |
| 2015/0141784 A1 | 5/2015 | Morun et al. | |
| 2015/0148641 A1 | 5/2015 | Morun et al. | |
| 2015/0157944 A1 | 6/2015 | Gottlieb | |

(56) References Cited

U.S. PATENT DOCUMENTS

| | | |
|---|---|---|
| 2015/0169074 A1 | 6/2015 | Ataee et al. |
| 2015/0193949 A1 | 7/2015 | Katz et al. |
| 2015/0234426 A1 | 8/2015 | Bailey et al. |
| 2015/0261306 A1 | 9/2015 | Lake |
| 2015/0261318 A1 | 9/2015 | Scavezze et al. |
| 2015/0277575 A1 | 10/2015 | Ataee et al. |
| 2015/0296553 A1 | 10/2015 | DiFranco et al. |
| 2015/0302168 A1 | 10/2015 | De Sapio et al. |
| 2015/0309563 A1 | 10/2015 | Connor |
| 2015/0309582 A1 | 10/2015 | Gupta |
| 2015/0313496 A1 | 11/2015 | Connor |
| 2015/0325202 A1 | 11/2015 | Lake et al. |
| 2015/0346701 A1 | 12/2015 | Gordon et al. |
| 2015/0370326 A1 | 12/2015 | Chapeskie et al. |
| 2015/0370333 A1 | 12/2015 | Ataee et al. |
| 2016/0011668 A1 | 1/2016 | Gilad-Bachrach et al. |
| 2016/0049073 A1 | 2/2016 | Lee |
| 2016/0162604 A1 | 6/2016 | Xiaoli et al. |
| 2016/0187992 A1 | 6/2016 | Yamamoto et al. |
| 2016/0235323 A1 | 8/2016 | Tadi et al. |
| 2016/0262687 A1 | 9/2016 | Imperial |
| 2016/0274758 A1 | 9/2016 | Bailey |
| 2016/0292497 A1* | 10/2016 | Kehtarnavaz .......... H04N 5/232 |
| 2016/0313798 A1 | 10/2016 | Connor |
| 2016/0313801 A1 | 10/2016 | Wagner et al. |
| 2016/0313899 A1 | 10/2016 | Noel |
| 2016/0350973 A1 | 12/2016 | Shapira et al. |
| 2017/0031502 A1 | 2/2017 | Rosenberg et al. |
| 2017/0061817 A1 | 3/2017 | Mettler May |
| 2017/0080346 A1 | 3/2017 | Abbas |
| 2017/0090604 A1 | 3/2017 | Barbier |
| 2017/0119472 A1 | 5/2017 | Herrmann et al. |
| 2017/0123487 A1 | 5/2017 | Hazra et al. |
| 2017/0124816 A1 | 5/2017 | Yang et al. |
| 2017/0188980 A1 | 7/2017 | Ash |
| 2017/0259167 A1 | 9/2017 | Cook et al. |
| 2017/0285848 A1 | 10/2017 | Rosenberg et al. |
| 2017/0296363 A1 | 10/2017 | Yetkin et al. |
| 2017/0308118 A1 | 10/2017 | Ito |
| 2018/0020951 A1 | 1/2018 | Kaifosh et al. |
| 2018/0020978 A1 | 1/2018 | Kaifosh et al. |
| 2018/0024634 A1 | 1/2018 | Kaifosh et al. |
| 2018/0024635 A1 | 1/2018 | Kaifosh et al. |
| 2018/0064363 A1 | 3/2018 | Morun et al. |
| 2018/0067553 A1 | 3/2018 | Morun et al. |
| 2018/0088765 A1 | 3/2018 | Bailey |
| 2018/0095630 A1 | 4/2018 | Bailey |
| 2018/0101289 A1 | 4/2018 | Bailey |
| 2018/0120948 A1 | 5/2018 | Aleem et al. |
| 2018/0140441 A1 | 5/2018 | Poirters |
| 2018/0150033 A1 | 5/2018 | Lake et al. |
| 2018/0153430 A1* | 6/2018 | Ang .................... A61B 5/0488 |
| 2018/0153444 A1 | 6/2018 | Yang et al. |
| 2018/0154140 A1 | 6/2018 | Bouton et al. |
| 2018/0301057 A1 | 10/2018 | Hargrove et al. |
| 2018/0307314 A1 | 10/2018 | Connor |
| 2018/0321745 A1 | 11/2018 | Morun et al. |
| 2018/0321746 A1 | 11/2018 | Morun et al. |
| 2018/0333575 A1 | 11/2018 | Bouton |
| 2018/0344195 A1 | 12/2018 | Morun et al. |
| 2018/0360379 A1 | 12/2018 | Harrison et al. |
| 2019/0025919 A1 | 1/2019 | Tadi et al. |
| 2019/0033967 A1 | 1/2019 | Morun et al. |
| 2019/0033974 A1* | 1/2019 | Mu .......................... G06F 3/017 |
| 2019/0038166 A1 | 2/2019 | Tavabi et al. |
| 2019/0076716 A1 | 3/2019 | Chiou et al. |
| 2019/0121305 A1 | 4/2019 | Kaifosh et al. |
| 2019/0121306 A1 | 4/2019 | Kaifosh et al. |
| 2019/0150777 A1 | 5/2019 | Guo et al. |
| 2019/0192037 A1 | 6/2019 | Morun et al. |
| 2019/0212817 A1 | 7/2019 | Kaifosh et al. |
| 2019/0223748 A1 | 7/2019 | Al-natsheh et al. |
| 2019/0227627 A1 | 7/2019 | Kaifosh et al. |
| 2019/0228533 A1 | 7/2019 | Giurgica-Tiron et al. |
| 2019/0228579 A1 | 7/2019 | Kaifosh et al. |
| 2019/0228590 A1 | 7/2019 | Kaifosh et al. |
| 2019/0228591 A1 | 7/2019 | Giurgica-Tiron et al. |

FOREIGN PATENT DOCUMENTS

| | | |
|---|---|---|
| CA | 2939644 A1 | 8/2015 |
| CN | 1838933 A | 9/2006 |
| CN | 105190578 A | 12/2015 |
| CN | 106102504 A | 11/2016 |
| EP | 2 198 521 B1 | 6/2012 |
| EP | 2 959 394 A1 | 12/2015 |
| EP | 3 104 737 A1 | 12/2016 |
| JP | H05-277080 A | 10/1993 |
| JP | 2005-095561 A | 4/2005 |
| JP | 2010-520561 A | 6/2010 |
| JP | 2016-507851 A | 3/2016 |
| JP | 2017-509386 A | 4/2017 |
| KR | 2015-0123254 A | 11/2015 |
| KR | 2016-0121552 A | 10/2016 |
| KR | 10-1790147 B1 | 10/2017 |
| WO | WO 2008/109248 A2 | 9/2008 |
| WO | WO 2009/042313 A1 | 4/2009 |
| WO | WO 2014/130871 A1 | 8/2014 |
| WO | WO 2014/186370 A1 | 11/2014 |
| WO | WO 2014/194257 A1 | 12/2014 |
| WO | WO 2014/197443 A1 | 12/2014 |
| WO | WO 2015/027089 A1 | 2/2015 |
| WO | WO 2015/073713 A1 | 5/2015 |
| WO | WO 2015/081113 A1 | 6/2015 |
| WO | WO 2015/123445 A1 | 8/2015 |
| WO | WO 2015/199747 A1 | 12/2015 |
| WO | WO 2016/041088 A1 | 3/2016 |
| WO | WO 2017/062544 A1 | 4/2017 |
| WO | WO 2017/092225 A1 | 6/2017 |
| WO | WO 2017/120669 A1 | 7/2017 |
| WO | WO 2017/172185 A1 | 10/2017 |

OTHER PUBLICATIONS

Lopes, Joao et al., "Hand/arm gesture segmentation by motion using IMU and EMG sensing," Published by Elsevier B.V. Procedia Manufacturing 11 ( 2017 ) 107-113 (2017) (Year: 2017).*

Favorskaya, M. et al., "Localization and Recognition of Dynamic Hand Gestures Based on Hierarchy of Manifold Classifiers," The International Archives of the Photogrammetry, Remote Sensing and Spatial Information Sciences, vol. XL-5/W6, pp. 1-8 (Year: 2015).*

Mendes Jr., Jose, et al., "Sensor Fusion and Smart Sensor in Sports and Biomedical Applications," Sensors 2016, 16, 1569; doi: 10.3390/s16101569, pp. 1-31 (Year: 2016).*

Martin, Harold, et al. "A Novel Approach of Prosthetic Arm Control using Computer Vision, Biosignals, and Motion Capture," pp. 1-5 (Year: 2014).*

International Search Report and Written Opinion for International Application No. PCT/US2017/043686 dated Oct. 6, 2017.

International Preliminary Report on Patentability for International Application No. PCT/US2017/043686 dated Feb. 7, 2019.

International Search Report and Written Opinion for International Application No. PCT/US2017/043693 dated Oct. 6, 2017.

International Preliminary Report on Patentability for International Application No. PCT/US2017/043693 dated Feb. 7, 2019.

International Search Report and Written Opinion for International Application No. PCT/US2017/043791 dated Oct. 5, 2017.

International Preliminary Report on Patentability for International Application No. PCT/US2017/043791 dated Feb. 7, 2019.

International Search Report and Written Opinion for International Application No. PCT/US2017/043792 dated Oct. 5, 2017.

International Preliminary Report on Patentability for International Application No. PCT/US2017/043792 dated Feb. 7, 2019.

International Search Report and Written Opinion for International Application No. PCT/US2018/056768 dated Jan. 15, 2019.

International Search Report and Written Opinion for International Application No. PCT/US2018/061409 dated Mar. 12, 2019.

International Search Report and Written Opinion for International Application No. PCT/US2018/063215 dated Mar. 21, 2019.

(56) References Cited

OTHER PUBLICATIONS

Benko et al., Enhancing Input on and Above the Interactive Surface with Muscle Sensing. The ACM International Conference on Interactive Tabletops and Surfaces. ITS '09. 2009:93-100.
Boyali et al., Spectral Collaborative Representation based Classification for hand gestures recognition on electromyography signals. Biomedical Signal Processing and Control. 2016;24:11-18.
Cheng et al., A Novel Phonology- and Radical-Coded Chinese Sign Language Recognition Framework Using Accelerometer and Surface Electromyography Sensors. Sensors. 2015;15:23303-24.
Csapo et al., Evaluation of Human-Myo Gesture Control Capabilities in Continuous Search and Select Operations. 7th IEEE International Conference on Cognitive Infocommunications. 2016;000415-20.
Delis et al., Development of a Myoelectric Controller Based on Knee Angle Estimation. Biodevices 2009. International Conference on Biomedical Electronics and Devices. Jan. 17, 2009. 7 pages.
Diener et al., Direct conversion from facial myoelectric signals to speech using Deep Neural Networks. 2015 International Joint Conference on Neural Networks (IJCNN). Oct. 1, 2015. 7 pages.
Ding et al., HMM with improved feature extraction-based feature parameters for identity recognition of gesture command operators by using a sensed Kinect-data stream. Neurocomputing. 2017;262:108-19.
Farina et al., Man/machine interface based on the discharge timings of spinal motor neurons after targeted muscle reinnervation. Nature. Biomedical Engineering. 2017;1:1-12.
Gallina et al., Surface EMG Biofeedback. Surface Electromyography: Physiology, Engineering, and Applications. 2016:485-500.
Jiang, Purdue University Graduate School Thesis/Dissertation Acceptance. Graduate School Form 30. Updated Jan. 15, 2015. 24 pages.
Kawaguchi et al., Estimation of Finger Joint Angles Based on Electromechanical Sensing of Wrist Shape. IEEE Transactions on Neural Systems and Rehabilitation Engineering. 2017;25(9):1409-18.
Kim et al., Real-Time Human Pose Estimation and Gesture Recognition from Depth Images Using Superpixels and SVM Classifier. Sensors. 2015;15:12410-27.
Koerner, Design and Characterization of the Exo-Skin Haptic Device: A Novel Tendon Actuated Textile Hand Exoskeleton. 2017. 5 pages.
Li et al., Motor Function Evaluation of Hemiplegic Upper-Extremities Using Data Fusion from Wearable Inertial and Surface EMG Sensors. Sensors. MDPI. 2017;17(582):1-17.
McIntee, A Task Model of Free-Space Movement-Based Geastures. Dissertation. Graduate Faculty of North Carolina State University. Computer Science. 2016. 129 pages.
Naik et al., Source Separation and Identification issues in bio signals: A solution using Blind source seperation. Intech. 2009. 23 pages.
Naik et al., Subtle Hand gesture identification for HCI using Temporal Decorrelation Source Separation BSS of surface EMG. Digital Image Computing Techniques and Applications. IEEE Computer Society. 2007;30-7.
Negro et al., Multi-channel intramuscular and surface EMG decomposition by convolutive blind source separation. Journal of Neural Engineering. 2016;13:1-17.
Saponas et al., Demonstrating the Feasibility of Using Forearm Electromyography for Muscle-Computer Interfaces. CHI 2008 Proceedings. Physiological Sensing for Input. 2008:515-24.
Saponas et al., Enabling Always-Available Input with Muscle-Computer Interfaces. UIST '09. 2009:167-76.
Saponas et al., Making Muscle-Computer Interfaces More Practical. CHI 2010: Brauns and Brawn. 2010:851-4.
Sauras-Perez et al., A Voice and Pointing Gesture Interaction System for Supporting Human Spontaneous Decisions in Autonomous Cars. Clemson University. All Dissertations. 2017. 174 pages.
Shen et al., I am a Smartwatch and I can Track my User's Arm. University of Illinois at Urbana-Champaign. MobiSys' 16.
Son et al., Evaluating the utility of two gestural discomfort evaluation methods. PLOS One. 2017. 21 pages.
Strbac et al., Microsoft Kinect-Based Artificial Perception System for Control of Functional Electrical Stimulation Assisted Grasping. Hindawi Publishing Corporation. BioMed Research International. 2014. 13 pages.
Torres, Myo Gesture Control Armband. PCMag. Https://www.pcmag.com/article2/0,2817,2485462,00.asp 2015. 9 pages.
Wodzinski et al., Sequential Classification of Palm Gestures Based on A* Algorithm and MLP Neural Network for Quadrocopter Control. Metrol. Meas. Syst., 2017;24(2):265-76.
Xue et al., Multiple Sensors Based Hand Motion Recognition Using Adaptive Directed Acyclic Graph. Applied Sciences. MDPI. 2017;7(358):1-14.
International Search Report and Written Opinion for International Application No. PCT/US2019/015134 dated May 15, 2019.
International Search Report and Written Opinion for International Application No. PCT/US2019/015167 dated May 21, 2019.
International Search Report and Written Opinion for International Application No. PCT/US2019/015174 dated May 21, 2019.
International Search Report and Written Opinion for International Application No. PCT/US2019/015238 dated May 16, 2019.
International Search Report and Written Opinion for International Application No. PCT/US2019/015183 dated May 3, 2019.
International Search Report and Written Opinion for International Application No. PCT/US2019/015180 dated May 28, 2019.
International Search Report and Written Opinion for International Application No. PCT/US2019/015244 dated May 16, 2019.
International Search Report and Written Opinion for International Application No. PCT/US19/20065 dated May 16, 2019.
Davoodi et al., Development of a Physics-Based Target Shooting Game to Train Amputee Users of Multijoint Upper Limb Protheses. Presence. Massachusetts Institute of Technology. 2012;21(1):85-95.
Gopura et al., A Human Forearm and wrist motion assist exoskeleton robot with EMG-based fuzzy-neuro control. Proceedings of the 2nd IEEE/RAS-EMBS International Conference on Biomedial Robotics and Biomechatronics. Oct. 19-22, 2008. 6 pages.
Hauschild et al., A Virtual Reality Environment for Designing and Fitting Neural Prosthetic Limbs. IEEE Transactions on Neural Systems and Rehabilitation Engineering. 2007;15(1):9-15.
Lee et al., Motion and Force Estimation System of Human Fingers. Journal of Institute of Control, Robotics and Systems. 2011;17(10):1014-1020.
Sartori et al., Neural Data-Driven Musculoskeletal Modeling for Personalized Neurorehabilitation Technologies. IEEE Transactions on Biomedical Engineering. 2016;63(5):879-93.
PCT/US2019/015134, dated May 15, 2019, International Search Report and Written Opinion.
PCT/US2019/015167, dated May 21, 2019, International Search Report and Written Opinion.
PCT/US2019/015174, dated May 21, 2019, International Search Report and Written Opinion.
PCT/US2019/015238, dated May 16, 2019, International Search Report and Written Opinion.
PCT/US2019/015183, dated May 3, 2019, International Search Report and Written Opinion.
PCT/US2019/015180, dated May 28, 2019, International Search Report and Written Opinion.
PCT/US2019/015244, dated May 16, 2019, International Search Report and Written Opinion.
PCT/US19/20065, dated May 16, 2019, International Search Report and Written Opinion.

* cited by examiner

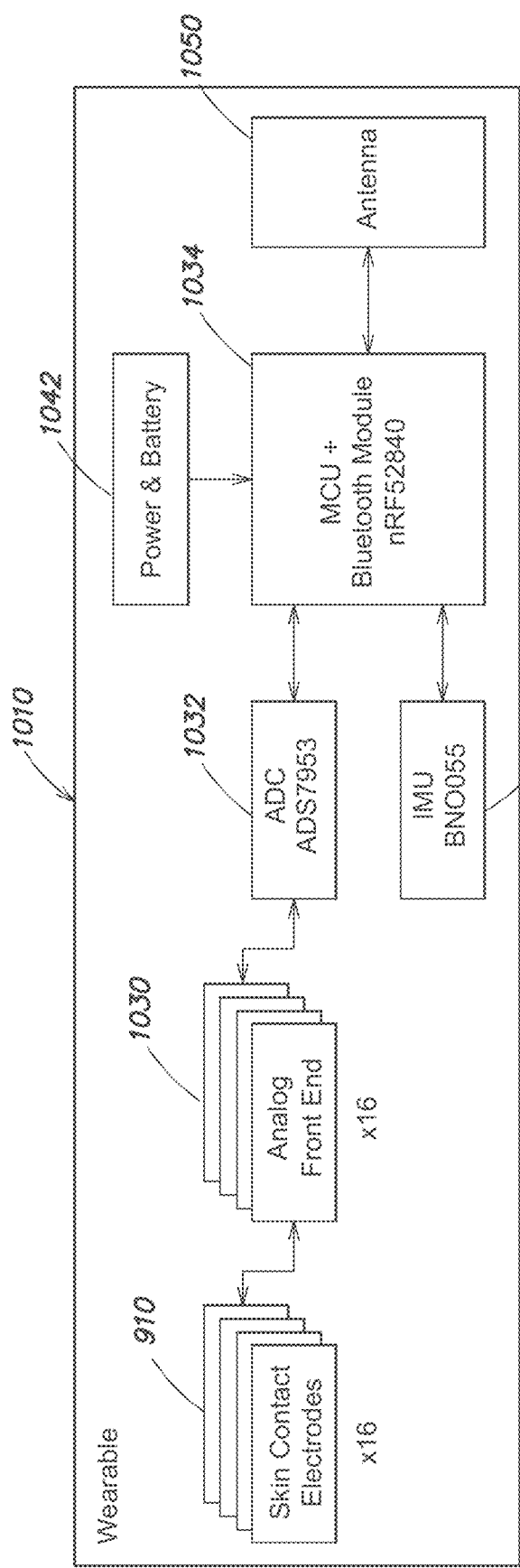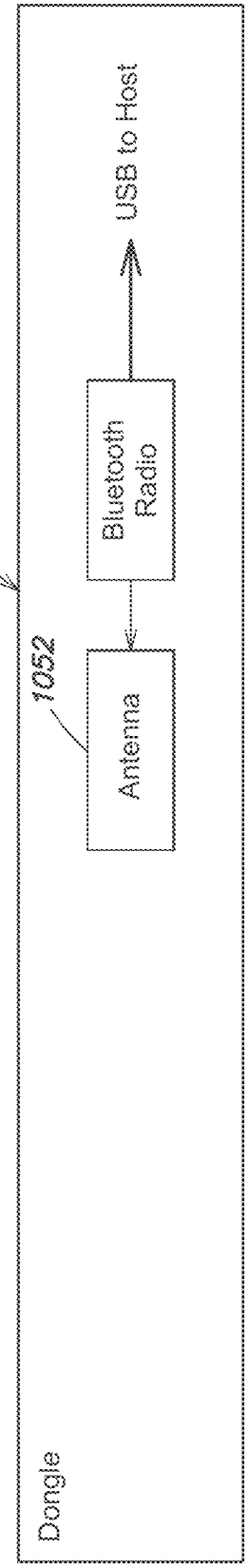
FIG. 10A
FIG. 10B

HANDSTATE RECONSTRUCTION BASED ON MULTIPLE INPUTS

RELATED APPLICATIONS

This application claims priority under 35 U.S.C. § 119(e) to U.S. Provisional Application Ser. No. 62/621,818, entitled "HANDSTATE RECONSTRUCTION BASED ON MULTIPLE INPUTS," filed on Jan. 25, 2018, which is incorporated by reference in its entirety.

BACKGROUND

In some computer applications that generate musculoskeletal representations of the human body, it is desirable for the application to know the spatial positioning, orientation and movement of a user's body to provide a realistic representation of body movement. For example, in a virtual reality (VR) environment, tracking the spatial position of the user's hand enables the application to represent hand motion in the VR environment, which allows the user to interact with (e.g., by grasping or manipulating) virtual objects within the VR environment. Some existing techniques for tracking movements of a user's body using wearable sensors include using information obtained from multiple Inertial Measurement Units (IMUs) affixed to different parts of the user's body, and using external imaging sensors (e.g., fixed-position cameras) to reconstruct the position and orientation of parts of the user's body.

SUMMARY

Some embodiments are directed to predicting information about the positioning and movements of portions of a user's arm and/or hand represented as a multi-segment articulated rigid body system with joints connecting the multiple segments of the rigid body system. Signals recorded by wearable neuromuscular sensors placed at locations on the user's body are provided as input to a statistical model trained to predict estimates of the position (e.g., absolute position, relative position, orientation) and forces associated with a plurality of rigid segments in a computer-based musculoskeletal representation associated with a hand when a user performs one or more movements. The combination of position information and force information associated with segments of a musculoskeletal representation associated with a hand is colloquially referred to herein as a "handstate" of the musculoskeletal representation. As a user performs different movements, a trained statistical model interprets neuromuscular signals recorded by the wearable neuromuscular sensors into position and force estimates (handstate information) that are used to update the musculoskeletal representation. As the neuromuscular signals are continuously recorded, the musculoskeletal representation is updated in real time and a visual representation of a hand (e.g., within a virtual reality environment) is optionally rendered based on the current handstate estimates.

According to some embodiments, a system is configured to use camera information to improve interpretation of neuromuscular signals and their relationship to movement and force generation. For example, inside-out cameras may be used in association with neuromuscular signals to more accurately represent movement and/or representations of force. For example, camera information such as images, video, time series of images, etc. may be used to calibrate neuromuscular systems by providing ground truth labels for neuromuscular signal data. In one implementation, a system may perform a calibration operation using prompts (e.g., hand gestures, words (e.g., "fist"), audio ("make a thumbs up gesture")) provided to a user through a display or speaker, where the user is asked to match their hand posture to that of the projected hand, with the camera potentially assisting with detection of when a match occurs. Further, other types of camera data may be used to calibrate a neuromuscular system, such as calibrating a geometric model of skeletal geometry using camera data. For instance, finger lengths of a geometric model may be verified and/or corrected using camera data. In such a case, images may be translated to mathematical arrangements of segments and joints.

In some embodiments, neuromuscular signals, camera data, or both may be used to provide a real-time determination of musculoskeletal representations. For instance, as EMG and IMU information may be used to determine a more accurate musculoskeletal representation, other data such as camera data may be used to create a more accurate and consistent representation. Further, it is appreciated that multiple signals can be used, including, but not limited to, one or more cameras, neuromuscular signals from one or more devices, among other types of sensor data, to determine real-time musculoskeletal representations. Other sensor data, including IMU and camera data, may be used to train and improve the statistical model as well as improve the real time representation of skeletal position.

In some embodiments, a system may combine neuromuscular signals and camera data (e.g., camera signal) to reconstruct skeletal position. The system may be adapted to adjust a level of influence given to each signal based on the quality of that signal. For instance, in the case of a camera signal, there may be field of view or occlusion restrictions that cause the camera data to be unreliable or inaccurate. In the case of neuromuscular signals, for instance, there may be EMG artifacts produced that cause the EMG signal to be unreliable. In such cases, the system may be configured to assess a quality level of each of the signals to determine whether either or both should be used (e.g., to display a current hand state). The system may also use weighting or other combining method to adjust the levels of signal used between the sensor types. Also, when confidence in a particular sensor source is high, that signal may be used to train and/or correct the other source model. For instance, a quality of the neuromuscular signals can be assessed in cases where the hand is in clear view of the camera, and a retraining of the handstate model can be performed.

In some embodiments, a system may include a first statistical model for generating a musculoskeletal representation based on neuromuscular signals and a second model for generating a musculoskeletal representation based on camera input. The system may be configured to transition between the use of the first statistical model and the use of the second statistical model for representing a user's handstate based, at least in part, on information associated with the camera input, such as whether all or a portion of the user's hand is within the camera's field of view. For example, when the user's hand is within the camera's field of view, the second statistical model may be used to determine the position of the segments of the user's hand, whereas when the user's hand is not within the camera's field of view, the first statistical model may be used to determine the position of the segments of the user's hand representing the handstate. As an alternative implementation, a single statistical model that receives both neuromuscular signals and camera input may be used, and the contribution of the inputs may be weighted as, described above. In instances in which the user's hand is out of the field of view of the camera, the camera input weight may be set to zero or some other small value to reflect the unreliability of the camera input for estimating position information when the user's hand is out of the camera's field of view.

In some embodiments, the camera and its data can be used to determine the position of the arm, hand, forearm or other appendage. Also, camera data may be used to combat drift in an IMU-based estimate of forearm position, with the IMU information being used to measure forearm orientation and the neuromuscular signals being used to determine hand and wrist configuration and forces. For this situation, positional tracking reference marks on an EMG band could be helpful, especially when the cameras are being used to refine the IMU-based system for tracking position of articulated rigid bodies.

According to some embodiments, camera data can be used for determining whether an object (e.g., a hand, finger) is subjected to a force. For instance, camera data may be used to distinguish between whether someone is moving freely or pressing against an object/surface, determine which objects are being interacted with, which positions on the surfaces/objects are being touched, and can assist with estimating skeletal configuration/position. It is appreciated that although camera data can be used to determine whether a force is being applied, camera data is not particularly suited to determining the magnitude of the forces applied. To this end, other input signals (e.g., neuromuscular signals) can be used to determine the amount of force applied and also assist with determining the skeletal configuration/position.

According to one aspect, a computerized system is provided for using camera information to calibrate the performance of one or more statistical models used to generate a musculoskeletal representation, the system comprising at least one camera configured to capture at least one image, a plurality of neuromuscular sensors configured to record a plurality of neuromuscular signals from a user, wherein the plurality of neuromuscular sensors are arranged on one or more wearable devices, and at least one computer processor programmed to calibrate the performance of the one or more statistical models by updating at least one parameter of the one or more statistical models based, at least in part, on the plurality of neuromuscular signals and the at least one image. In some embodiments, updating the at least one parameter of the one or more statistical models comprises training the one or more statistical models to produce output determined based, at least in part, on the at least one image when the plurality of neuromuscular signals and/or information derived from the plurality of neuromuscular signals is provided as input to the one or more statistical models.

In some embodiments, the user-specific skeletal geometry comprises a length of at least one finger of the user. In some embodiments, the at least one camera is configured to capture a plurality of images in a time series, and wherein updating at least one parameter of the one or more statistical models is further based, at least in part, on the plurality of images captured in a time series.

According to another aspect, a method performed by a computerized system is provided for using camera information to calibrate the performance of one or more statistical models used to generate a musculoskeletal representation, the method comprising capturing at least one image using at least one camera, recording a plurality of neuromuscular signals from a user using a plurality of neuromuscular sensors arranged on one or more wearable devices, and calibrating the performance of the one or more statistical models by updating at least one parameter of the one or more statistical models based, at least in part, on the plurality of neuromuscular signals and the at least one image.

Other embodiments are directed to a computerized system for providing a dynamically-updated musculoskeletal representation associated with a hand. The system comprises a plurality of sensors including a plurality of neuromuscular sensors configured to continuously record a plurality of neuromuscular signals from a user, wherein the plurality of neuromuscular sensors are arranged on one or more wearable devices, and at least one computer processor. The at least one computer processor is programmed to provide as input to a trained statistical model, the plurality of neuromuscular signals, determine, based on an output of the trained statistical model, position information describing a spatial relationship between two or more connected segments of the musculoskeletal representation, and to determine force information describing a force exerted by at least one segment of the musculoskeletal representation. The at least one computer processor is further programmed to update the musculoskeletal representation based, at least in part, on the position information and the force information.

In one aspect, the musculoskeletal representation associated with the hand includes at least one segment corresponding to an arm connected to the hand.

In another aspect, the determined position information comprises a set of joint angles describing the spatial relationship between the two or more connected segments of the musculoskeletal representation.

In another aspect, the determined force information includes a linear force exerted by the at least one segment.

In another aspect, the determined force information includes a torque exerted by the at least one segment.

In another aspect, the determined force information comprises pinching force information, grasping force information, or information about co-contraction forces.

In another aspect, the plurality of sensors further comprises at least one auxiliary sensor configured to continuously record a plurality of auxiliary signals associated with hand movements of the user, wherein the plurality of auxiliary signals are selected from the group consisting of positions, accelerations, forces, and angular rotations associated with the hand movements of the user, and wherein the at least one computer processor is further programmed to provide as input to the trained statistical model, the plurality of auxiliary signals.

In another aspect, the at least one auxiliary sensor comprises at least one inertial measurement unit (IMU) sensor configured to continuously record IMU signals.

In another aspect, the at least one auxiliary sensor comprises at least one imaging sensor configured to capture images of at least a portion of the arm and/or hand of the user.

In another aspect, the at least one auxiliary sensor comprises a radiation-based sensor configured to detect when radiation is incident on the sensor.

In another aspect, the plurality of neuromuscular sensors comprise electromyography (EMG) sensors, mechanomyography (MMG) sensors, sonomyography (SMG) sensors, or a combination of two or more of EMG, MMG and SMG sensors.

In another aspect, the plurality of neuromuscular sensors are configured to continuously record the plurality of neuromuscular signals at a first sampling rate and the at least one auxiliary sensor is configured to record the plurality of auxiliary signals at a second sampling rate, wherein the first sampling rate and second sampling rate are different, and wherein (1) at least one of the plurality of neuromuscular signals or the plurality of auxiliary signals are resampled such that the plurality of neuromuscular signals and the plurality of auxiliary signals are provided as input to the trained statistical model at a same rate; (2) wherein the trained statistical model is configured to process asynchronous inputs; or (3) wherein the trained statistical model comprises: a first trained statistical model configured to receive as input the plurality of neuromuscular signals at the first sampling rate; a second trained statistical model configured to receive as input the plurality of auxiliary signals at the second sampling rate; and a combiner configured to combine outputs of the first trained statistical model and the second trained statistical model to provide the output of the trained statistical model.

In another aspect, the at least one computer processor is further programmed to: determine whether to provide as input to the trained statistical model the plurality of neuromuscular signals, the plurality of auxiliary signals, or the plurality of neuromuscular signals and the plurality of auxiliary signals, wherein the determination is made based on a confidence associated with the plurality of neuromuscular signals and/or a confidence associated with the plurality of the auxiliary signals.

In another aspect, the at least one computer processor is further programmed to: determine a first confidence value associated with the plurality of auxiliary signals; and provide as input to the trained statistical model, the plurality of auxiliary signals when the first confidence value is greater than a first threshold value.

In another aspect, the plurality of auxiliary signals comprise a plurality of images captured by an imaging sensor, and wherein determining the first confidence value comprises determining the first confidence value based, at least in part, on whether the hand of the user is fully or partially occluded in the plurality of images.

In another aspect, the at least one computer processor is further programmed to: determine a second confidence value associated with the plurality of neuromuscular signals; and provide as input to the trained statistical model, the plurality of neuromuscular signals when the second confidence value is greater than a second threshold value.

In another aspect, the at least one computer processor is further programmed to provide as input to the trained statistical model, the plurality of auxiliary signals and the plurality of neuromuscular signals when the first confidence value is greater than the first threshold value and the second confidence value is greater than the second threshold value.

In another aspect, the at least one computer processor is further programmed to: determine at least one weight based on a confidence associated with the plurality of neuromuscular signals and/or a confidence associated with the plurality of auxiliary signals; and provide as input to the trained statistical model the plurality of neuromuscular signals and the plurality of auxiliary signals, wherein one or both of the plurality of neuromuscular signals and the plurality of auxiliary signals provided as input to the trained statistical model are weighted by the at least one weight.

In another aspect, the at least one computer processor is further programmed to modify at least one parameter of the trained statistical model based, at least in part, on at least one characteristic of the output of the trained statistical model.

In another aspect, the at least one characteristic of the output of the trained statistical model comprises a variance, a covariance or an entropy associated with the output of the trained statistical model.

In another aspect, the at least one computer processor is further programmed to determine whether to provide as input to the trained statistical model the plurality of neuromuscular signals, the plurality of auxiliary signals, or the plurality of neuromuscular signals and the plurality of auxiliary signals, wherein the determination is made based on a previous output of the trained statistical model.

In another aspect, the at least one computer processor is programmed to provide as input to the trained statistical model the plurality of neuromuscular signals and the plurality of auxiliary signals, wherein the trained statistical model is configured to combine the plurality of neuromuscular signals and the plurality of auxiliary signals using a Bayesian framework.

In another aspect, the plurality of neuromuscular sensors and the at least one auxiliary sensor are arranged on a same wearable device.

In another aspect, the at least one computer processor is further programmed to: determine derived information based, at least in part on the plurality of neuromuscular signals and/or the plurality of auxiliary signals, and provide the derived information as input to the trained statistical model.

In another aspect, the derived information comprises derived force information.

In another aspect, a manifold defines a complete representational space of possible position information and force information output by the trained statistical model, and wherein the at least one processor is further programmed to update the musculoskeletal representation based on a submanifold of the manifold, wherein the submanifold defines a reduced dimensionality of the complete representational space.

In another aspect, updating the musculoskeletal representation based on the submanifold comprises parameterizing the output of the trained statistical model such that the position and/or force information falls within the submanifold.

In another aspect, updating the musculoskeletal representation based on the submanifold comprises projecting the position information and/or the force information determined based on the output of the trained statistical model onto the submanifold.

In another aspect, the at least one computer processor is further programmed to determine the submanifold based, at least in part, on uncertainties associated with one or more directions on the manifold.

In another aspect, determining the submanifold comprises: determining that a distribution along a direction on the manifold is narrower than a threshold value; and including the direction in the submanifold in response to determining that the distribution along the direction is narrower than the threshold value.

In another aspect, the at least one computer processor is further programmed to render a visual representation of a hand, and wherein updating the musculoskeletal representation hand comprises rendering the visual representation of the hand to have a reduced parameterization.

In another aspect, rendering the visual representation of the hand to have a reduce parameterization comprises rendering fewer than five fingers on the hand.

In another aspect, rendering the visual representation of the hand to have a reduced parameterization comprises rendering the visual representation of the hand such that multiple fingers on the hand move together.

In another aspect, rendering the visual representation of the hand to have a reduced parameterization comprises rendering at least one finger of the hand without joints.

In another aspect, rendering the visual representation of the hand to have a reduced parameterization comprises constraining multiple joints to move together in a fixed relation.

In another aspect, rendering the visual representation of the hand to have a reduced parameterization comprises restricting one or more degrees of freedom of movement at one or more joints of the hand.

In another aspect, the at least one computer processor is further programmed to: determine a quality of the output of the trained statistical model; and render a visual representation of a hand based, at least in part, on the updated musculoskeletal representation and the determined quality of the output of the trained statistical model.

In another aspect, rendering the visual representation of the hand based, at least in part, on the determined quality of the output of the trained statistical model comprises rendering the visual representation of the hand with a first anatomical resolution when the quality is less than a threshold value and rending the visual representation of the hand with a second anatomical resolution when the quality is higher than the threshold value, wherein the first anatomical resolution is less than the second anatomical resolution.

In another aspect, the second anatomical resolution constrains multiple fingers of the hand to move together and the first anatomical resolution allows each of the figures of the hand to move independently.

In another aspect, the at least one computer processor is further programmed to: provide as input to the trained statistical model, a fatigue state of at least one muscle of the user, wherein the output of the trained statistical model is based, at least in part, on the fatigue state of the at least one muscle.

In another aspect, the at least one computer processor is further programmed to: calculate a first power spectrum of one or more of the plurality of neuromuscular signals recorded over first time period; and determine the fatigue state of the at least one muscle based, at least in part, on the first power spectrum.

In another aspect, the at least one computer processor is further programmed to determine the fatigue state of the at least one muscle based, at least in part, on a comparison of the first power spectrum and a second power spectrum.

In another aspect, the at least one computer processor is further programmed to calculate the second power spectrum of the one or more of the plurality of neuromuscular signals recorded over a second time period later than the first time period.

In another aspect, the second power spectrum is a power spectrum calculated based neuromuscular signals recorded from a plurality of users.

In another aspect, determining the fatigue state is based, at least in part, on a comparison of the first power spectrum and the second power spectrum comprises determining that the at least one muscle is fatigued when the second power spectrum exhibits a downward shift compared to the first power spectrum.

In another aspect, the at least one computer processor is further programmed to: determine the fatigue state of the at least one muscle by extracting features from the first power spectrum; and provide as input to the trained statistical model, the extracted features.

In another aspect, provided as input to the trained statistical model is a fatigue state of the at least one muscle user comprises providing as input to the trained statistical model at least one spectral feature determined based, at least in part, on the plurality of neuromuscular signals.

In another aspect, the at least one computer processor is further programmed to determine, based on the output of the trained statistical model, absolute position information in space.

In another aspect, the absolute position information comprises a position of the at least a portion of the arm and/or hand relative to an object in proximity to the user.

In another aspect, the absolute position information comprises a position of that least a portion of the arm and/or hand relative to a torso of the user.

Other embodiments are directed to a method of providing a dynamically-updated musculoskeletal representation associated with a hand. The method comprises recording, using a plurality of neuromuscular sensors arranged on one or more wearable devices, a plurality of neuromuscular signals from a user, providing as input to a trained statistical model, the plurality of neuromuscular signals, determining, based on an output of the trained statistical model, position information describing a spatial relationship between two or more connected segments of the musculoskeletal representation, and force information describing a force exerted by at least one segment of the musculoskeletal representation. The method further comprises updating the computerized musculoskeletal representation based, at least in part, on the position information and the force information.

Other embodiments are directed to a computer system for training a statistical model to predict musculoskeletal position and force information based, at least in part, on signals recorded by a plurality of sensors, wherein the plurality of sensors include a plurality of neuromuscular sensors configured to record a plurality of neuromuscular signals. The computer system comprises an input interface configured to receive the plurality of neuromuscular signals recorded during performance of a task performed by one or more users, receive position information indicating a position of a plurality of rigid segments of a musculoskeletal representation during performance of the task performed by the one or more users, receive force information indicating a force exerted by at least one segment of the musculoskeletal representation during performance of the task performed by the one or more users. The computer system further comprises at least one storage device configured to store a plurality of instructions that, when executed by at least one computer processor perform a method of generating training data based, at least on part, on the received plurality of neuromuscular signals, the received position information, and the received force information, training the statistical model using at least some of the generated training data to output a trained statistical model; and storing, by the at least one storage device, the trained statistical model, wherein the trained statistical model is configured to predict musculoskeletal position and force information based, at least in part on continuously recorded signals from the neuromuscular sensors.

Other embodiments are directed to a computerized system for providing a dynamically-updated musculoskeletal representation. The system comprises a plurality of neuromuscular sensors configured to continuously record a plurality of neuromuscular signals from a user, and at least one computer processor programmed to provide as input to a trained statistical model, the plurality of neuromuscular signals, determine a resolution of an output of the trained statistical model, and render a visual representation based, at least in part, on the updated musculoskeletal representation and the determined resolution of the output of the trained statistical model.

Other embodiments are directed to a computerized system for providing a dynamically-updated musculoskeletal representation. The system comprises a plurality of neuromuscular sensors configured to continuously record a plurality of neuromuscular signals from a user, and at least one computer processor programmed to provide as input to a trained statistical model, the plurality of neuromuscular signals and a fatigue state of at least one muscle of the user, determine, based on an output of the trained statistical model estimates for the musculoskeletal model, and update the musculoskeletal representation based, at least in part, on the model estimates.

Other embodiments are directed to a method of providing a dynamically-updated musculoskeletal representation associated with a hand, the method comprising: recording, using a plurality of neuromuscular sensors arranged on one or more wearable devices, a plurality of neuromuscular signals from a user, providing as input to a trained statistical model, the plurality of neuromuscular signals; determining, based on an output of the trained statistical model: position information describing a spatial relationship between two or more connected segments of the musculoskeletal representation; and force information describing a force exerted by at least one segment of the musculoskeletal representation; and updating the computerized musculoskeletal representation based, at least in part, on the position information and the force information.

Other embodiments are directed to a computer system for training a statistical model to predict musculoskeletal position and force information based, at least in part, on signals recorded by a plurality of sensors, wherein the plurality of sensors include a plurality of neuromuscular sensors configured to record a plurality of neuromuscular signals, the computer system comprising: an input interface configured to: receive the plurality of neuromuscular signals recorded during performance of a task performed by one or more users; receive position information indicating a position of a plurality of rigid segments of a musculoskeletal representation during performance of the task performed by the one or more users; receive force information indicating a force exerted by at least one segment of the musculoskeletal representation during performance of the task performed by the one or more users; and at least one storage device configured to store a plurality of instructions that, when executed by at least one computer processor perform a method of: generating training data based, at least on part, on the received plurality of neuromuscular signals, the received position information, and the received force information; training the statistical model using at least some of the generated training data to output a trained statistical model; and storing, by the at least one storage device, the trained statistical model, wherein the trained statistical model is configured to predict musculoskeletal position and force information based, at least in part on continuously recorded signals from the neuromuscular sensors.

Other embodiments are directed to a computerized system for providing a dynamically-updated musculoskeletal representation, the system comprising: a plurality of neuromuscular sensors configured to continuously record a plurality of neuromuscular signals from a user; and at least one computer processor programmed to: provide as input to a trained statistical model, the plurality of neuromuscular signals; determine a resolution of an output of the trained statistical model; and render a visual representation based, at least in part, on the updated musculoskeletal representation and the determined resolution of the output of the trained statistical model.

In one aspect, the musculoskeletal representation is a musculoskeletal representation associated with a hand, and wherein the visual representation is a visual representation of a hand.

Other embodiments are directed to a computerized system for providing a dynamically-updated musculoskeletal representation, the system comprising: a plurality of neuromuscular sensors configured to continuously record a plurality of neuromuscular signals from a user; and at least one computer processor programmed to: provide as input to a trained statistical model, the plurality of neuromuscular signals and a fatigue state of at least one muscle of the user; determine, based on an output of the trained statistical model estimates for the musculoskeletal model; and update the musculoskeletal representation based, at least in part, on the model estimates.

In one aspect, the musculoskeletal representation is a musculoskeletal representation associated with a hand, and wherein determining model estimates for the musculoskeletal model comprises determining: position information describing a spatial relationship between two or more connected segments of the musculoskeletal representation; and force information describing a force exerted by at least one segment of the musculoskeletal representation, and wherein updating the musculoskeletal representation comprises updating the musculoskeletal information based, at least in part, on the position information and the force information.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various non-limiting embodiments of the technology will be described with reference to the following figures. It should be appreciated that the figures are not necessarily drawn to scale.

FIGS. 10A and 10B schematically illustrate components of a computer-based system on which some embodiments are implemented. FIG. 10A illustrates a wearable portion of the computer-based system and FIG. 10B illustrates a dongle portion connected to a computer, wherein the dongle portion is configured to communicate with the wearable portion.

DETAILED DESCRIPTION

Figure 1:
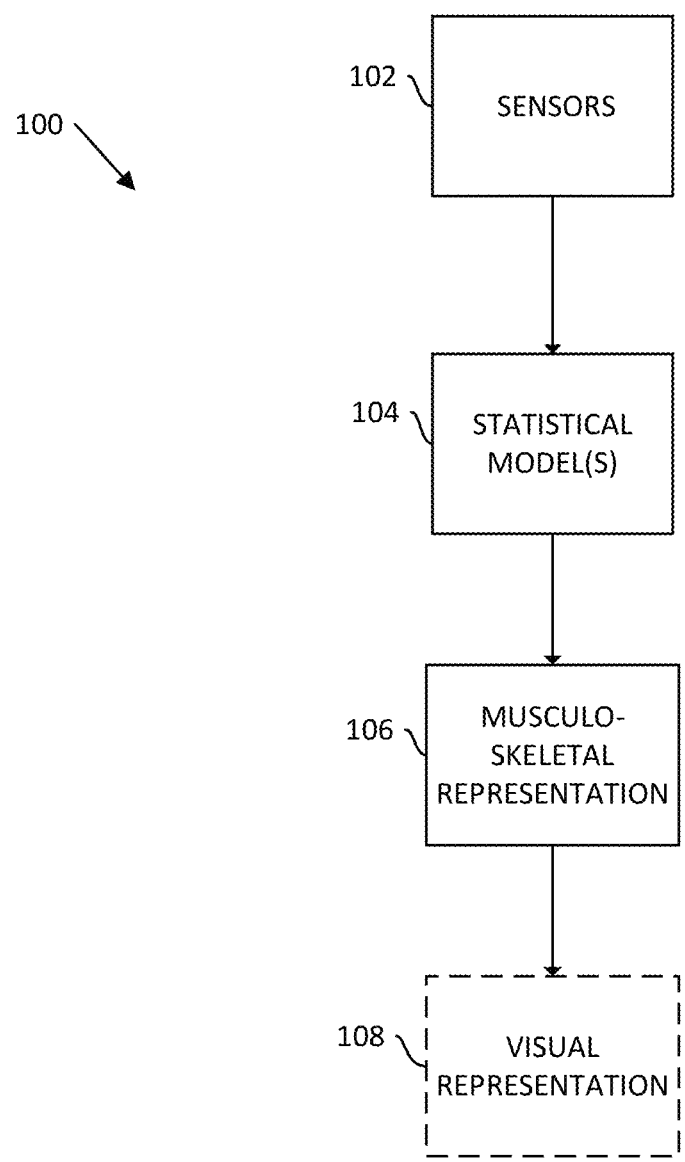
FIG. 1 is a schematic diagram of a computer-based system for reconstructing handstate information in accordance with some embodiments of the technology described herein.

The inventors have recognized that systems that exclusively employ one or more fixed-position cameras to track positions and/or movements of a user's body are limited in at least some respects. For example, the position and orientation of a target (e.g., a portion of the human body such as a hand) cannot be determined accurately when the target passes behind an object more proximal to one or more camera sensors (i.e., when the camera's view is occluded). If one or more cameras are arranged in front of a standing user, the camera(s) are incapable of tracking the position of the user's hand if the user places the hand behind their back or turns their body to block the line of sight between the hand and the one or more cameras. In some cases, a target (e.g. a user's hand) may be effectively occluded if the background of the target is low-contrast.

Increasing the number of cameras may mitigate occlusion, but such systems are generally complex, expensive, and typically require highly performant computerized systems to process signals in real-time.

Another limitation of camera-based systems is the inability of such systems to assign a tracked human body (or portion of a human body such as a hand) to a particular user over time in an environment with multiple users.

Some camera-based tracking systems employ markers that generate a unique optical signal to facilitate tracking of a particular user or body part (e.g., a user's left hand vs. right hand). However, marker-based systems are limited in at least some instances, because they typically require specialized clothing or a technician to place the markers for each tracking session.

Some conventional camera-based systems that track the position and/or movement of the human body are further limited in at least some instances, because they are generally unable to determine the force exerted by a user in a particular posture. Tracking the position of a part of the human body, such as the hand, without information about the force exerted during a particular movement or pose, prevents such systems from being used in applications in which estimating the force exerted by the musculoskeletal system is actionable. For example, in robotic surgery applications, the force exerted by a tool on the patient must be carefully controlled to avoid unintended tissue damage.

In some human-machine control systems—including virtual reality, augmented reality, and mixed reality systems—data from a handheld, wireless, inertial control device is fused with positional information from a camera-based system. Although these systems may overcome some of the challenges of camera-based systems mentioned above by incorporating easily identifiable visual features of the handheld device, such systems are also limited, in at least some respects, due to occlusion as described above. For example, some such systems comprise cameras on a head-mounted display and thus require that the portion of the body being tracked (e.g., a hand) is placed within the field of view of the camera.

Some systems are configured to estimate the position of a multi-articulated rigid body using sensors other than cameras. For example, neuromuscular signals recorded from a plurality of neuromuscular sensors arranged on device worn by a user may be used to track the position of a target (e.g., the user's hand). Such systems may overcome some challenges of camera-based systems for determining the position of a portion of the body (e.g., a subject's hand). However, the inventors have recognized that systems that use neuromuscular recordings to determination target position and movement may be limited in some instances in their ability to provide multidimensional (e.g., six degree-of-freedom (DOF)) estimates of the hand position/movement.

Some embodiments described herein address at least some of the aforementioned challenges and provide for an improved handstate reconstruction process by using inputs from multiple types of sensors (e.g., neuromuscular sensors and cameras).

Humans exert exquisite control over their hands, which serve as a primary mode of interacting with the environment, including human control of machines. Due in part to developments in virtual reality, augmented reality, mixed reality, and other human machine interaction frameworks, determining the position, handstate, and force of a user's hand is important for immersive and functional experiences. Neuromuscular recordings from the arm (e.g., the forearm and/or wrist) may be used to estimate the position and force (referred to herein as 'handstate') of a user's hand. In some embodiments, systems and methods are described that integrate or otherwise fuse multiple modalities of inputs to provide improved real-time information about handstate. For example, the output from a statistical modeled trained to estimate hand position and force from neuromuscular recordings may be fused with data from an inertial measurement unit (IMU) and/or tracking of hand position from a plurality of cameras resulting, for example, in more robust human machine control and more immersive virtual experiences than achievable with some conventional systems that use a single modality of input to estimate position and movement of a user's hands.

All or portions of the human musculoskeletal system can be modeled as a multi-segment articulated rigid body system, with joints forming the interfaces between the different segments and joint angles defining the spatial relationships between connected segments in the model. Constraints on the movement at the joints are governed by the type of joint connecting the segments and the biological structures (e.g., muscles, tendons, ligaments) that restrict the range of movement at the joint. For example, the shoulder joint connecting the upper arm to the torso and the hip joint connecting the upper leg to the torso are ball and socket joints that permit extension and flexion movements as well as rotational movements. By contrast, the elbow joint connecting the upper arm and the forearm and the knee joint connecting the upper leg and the lower leg allow for a more limited range of motion. As described herein, a multi-segment articulated rigid body system is used to model portions of the human musculoskeletal system. However, it should be appreciated that some segments of the human musculoskeletal system (e.g., the forearm), though approximated as a rigid body in the articulated rigid body system, may include multiple rigid structures (e.g., the ulna and radius bones of the forearm) that provide for more complex movement within the segment that is not explicitly considered by the rigid body model. Accordingly, a model of an articulated rigid body system for use with some embodiments of the technology described herein may include segments that represent a combination of body parts that are not strictly rigid bodies.

In kinematics, rigid bodies are objects that exhibit various attributes of motion (e.g., position, orientation, angular velocity, acceleration). Knowing the motion attributes of one segment of the rigid body enables the motion attributes for other segments of the rigid body to be determined based on constraints in how the segments are connected. For example, the hand may be modeled as a multi-segment articulated body with the joints in the wrist and each finger forming the interfaces between the multiple segments in the model. In some embodiments, movements of the segments in the rigid body model can be simulated as an articulated rigid body system in which position (e.g., actual position, relative position, or orientation) information of a segment relative to other segments in the model are predicted using a trained statistical model, as described in more detail below.

The portion of the human body approximated by a musculoskeletal representation as described herein as one non-limiting example, is a hand or a combination of a hand with one or more arm segments and the information used to describe a current state of the positional relationships between segments and force relationships for individual segments or combinations of segments in the musculoskeletal representation is referred to herein as the handstate of the musculoskeletal representation. It should be appreciated, however, that the techniques described herein are also applicable to musculoskeletal representations of portions of the body other than the hand including, but not limited to, an arm, a leg, a foot, a torso, a neck, or any combination of the foregoing.

In addition to spatial (e.g., position/orientation) information, some embodiments are configured to predict force information associated with one or more segments of the musculoskeletal representation. For example, linear forces or rotational (torque) forces exerted by one or more segments may be estimated. Examples of linear forces include, but are not limited to, the force of a finger or hand pressing on a solid object such as a table, and a force exerted when two segments (e.g., two fingers) are pinched together. Examples of rotational forces include, but are not limited to, rotational forces created when segments in the wrist or fingers are twisted or flexed. In some embodiments, the force information determined as a portion of a current handstate estimate includes one or more of pinching force information, grasping force information, or information about co-contraction forces between muscles represented by the musculoskeletal representation.

FIG. 1 illustrates a system 100 in accordance with some embodiments. The system includes a plurality of sensors 102 configured to record signals resulting from the movement of portions of a human body. Sensors 102 may include autonomous sensors. As used herein, the term "autonomous sensors" refers to sensors configured to measure the movement of body segments without requiring the use of external devices. In some embodiments, sensors 102 may also include non-autonomous sensors in combination with autonomous sensors. As used herein, the term "non-autonomous sensors" refers to sensors configured to measure the movement of body segments using external devices. Examples of external devices that include non-autonomous sensors include, but are not limited to, wearable (e.g. body-mounted) cameras, global positioning systems, or laser scanning systems.

Autonomous sensors may include a plurality of neuromuscular sensors configured to record signals arising from neuromuscular activity in skeletal muscle of a human body. The term "neuromuscular activity" as used herein refers to neural activation of spinal motor neurons that innervate a muscle, muscle activation, muscle contraction, or any combination of the neural activation, muscle activation, and muscle contraction. Neuromuscular sensors may include one or more electromyography (EMG) sensors, one or more mechanomyography (MMG) sensors, one or more sonomyography (SMG) sensors, a combination of two or more types of EMG sensors, MMG sensors, and SMG sensors, and/or one or more sensors of any suitable type that are configured to detect neuromuscular signals. In some embodiments, the plurality of neuromuscular sensors may be used to sense muscular activity related to a movement of the part of the body controlled by muscles from which the neuromuscular sensors are arranged to sense the muscle activity. Spatial information (e.g., position and/or orientation information) and force information describing the movement may be predicted based on the sensed neuromuscular signals as the user moves over time.

Autonomous sensors may include one or more Inertial Measurement Units (IMUs), which measure a combination of physical aspects of motion, using, for example, an accelerometer, a gyroscope, a magnetometer, or any combination of one or more accelerometers, gyroscopes and magnetometers. In some embodiments, IMUs may be used to sense information about the movement of the part of the body on which the IMU is attached and information derived from the sensed data (e.g., position and/or orientation information) may be tracked as the user moves over time. For example, one or more IMUs may be used to track movements of portions of a user's body proximal to the user's torso relative to the sensor (e.g., arms, legs) as the user moves over time.

In embodiments that include at least one IMU and a plurality of neuromuscular sensors, the IMU(s) and neuromuscular sensors may be arranged to detect movement of different parts of the human body. For example, the IMU(s) may be arranged to detect movements of one or more body segments proximal to the torso (e.g., an upper arm), whereas the neuromuscular sensors may be arranged to detect movements of one or more body segments distal to the torso (e.g., a forearm or wrist). It should be appreciated, however, that autonomous sensors may be arranged in any suitable way, and embodiments of the technology described herein are not limited based on the particular sensor arrangement. For example, in some embodiments, at least one IMU and a plurality of neuromuscular sensors may be co-located on a body segment to track movements of body segment using different types of measurements. In one implementation described in more detail below, an IMU sensor and a plurality of EMG sensors are arranged on a wearable device configured to be worn around the lower arm or wrist of a user. In such an arrangement, the IMU sensor may be configured to track movement information (e.g., positioning and/or orientation over time) associated with one or more arm segments, to determine, for example whether the user has raised or lowered their arm, whereas the EMG sensors may be configured to determine movement information associated with wrist or hand segments to determine, for example, whether the user has an open or closed hand configuration.

Each of the autonomous sensors includes one or more sensing components configured to sense information about a user. In the case of IMUs, the sensing components may include one or more accelerometers, gyroscopes, magnetometers, or any combination thereof to measure characteristics of body motion, examples of which include, but are not limited to, acceleration, angular velocity, and sensed magnetic field around the body. In the case of neuromuscular sensors, the sensing components may include, but are not limited to, electrodes configured to detect electric potentials on the surface of the body (e.g., for EMG sensors) vibration sensors configured to measure skin surface vibrations (e.g., for MMG sensors), and acoustic sensing components configured to measure ultrasound signals (e.g., for SMG sensors) arising from muscle activity.

In some embodiments, the output of one or more of the sensing components may be processed using hardware signal processing circuitry (e.g., to perform amplification, filtering, and/or rectification). In other embodiments, at least some signal processing of the output of the sensing components may be performed in software. Thus, signal processing of autonomous signals recorded by the autonomous sensors may be performed in hardware, software, or by any suitable combination of hardware and software, as aspects of the technology described herein are not limited in this respect.

In some embodiments, the recorded sensor data may be processed to compute additional derived measurements that are then provided as input to a statistical model, as described in more detail below. For example, recorded signals from an IMU sensor may be processed to derive an orientation signal that specifies the orientation of a rigid body segment over time. Autonomous sensors may implement signal processing using components integrated with the sensing components, or at least a portion of the signal processing may be performed by one or more components in communication with, but not directly integrated with the sensing components of the autonomous sensors.

In some embodiments, at least some of the plurality of autonomous sensors are arranged as a portion of a wearable device configured to be worn on or around part of a user's body. For example, in one non-limiting example, an IMU sensor and a plurality of neuromuscular sensors are arranged circumferentially around an adjustable and/or elastic band such as a wristband or armband configured to be worn around a user's wrist or arm. Alternatively, at least some of the autonomous sensors may be arranged on a wearable patch configured to be affixed to a portion of the user's body. In some embodiments, multiple wearable devices, each having one or more IMUs and/or neuromuscular sensors included thereon may be used to predict musculoskeletal position information for movements that involve multiple parts of the body.

In some embodiments, sensors 102 only includes a plurality of neuromuscular sensors (e.g., EMG sensors). In other embodiments, sensors 102 includes a plurality of neuromuscular sensors and at least one "auxiliary" sensor configured to continuously record a plurality of auxiliary signals. Examples of auxiliary sensors include, but are not limited to, other autonomous sensors such as IMU sensors, and non-autonomous sensors such as an imaging sensor (e.g., a camera), a radiation-based sensor for use with a radiation-generation device (e.g., a laser-scanning device), or other types of sensors such as a heart-rate monitor.

System 100 also includes one or more computer processors programmed to communicate with sensors 102. For example, signals recorded by one or more of the sensors may be provided to the processor(s), which may be programmed to execute one or more machine learning algorithms that process signals output by the sensors 102 to train one or more statistical models 104, and the trained (or retrained) statistical model(s) 104 may be stored for later use in generating a musculoskeletal representation 106, as described in more detail below. Non-limiting examples of statistical models that may be used in accordance with some embodiments to predict handstate information based on recorded signals from sensors 102 are discussed in more detail below in connection with FIG. 8.

System 100 also optionally includes a display controller configured to display a visual representation 108 (e.g., of a hand). As discussed in more detail below, one or more computer processors may implement one or more trained statistical models configured to predict handstate information based, at least in part, on signals recorded by sensors 102. The predicted handstate information is used to update the musculoskeletal representation 106, which is then optionally used to render a visual representation 108 based on the updated musculoskeletal representation incorporating the current handstate information. Real-time reconstruction of the current handstate and subsequent rendering of the visual representation reflecting the current handstate information in the musculoskeletal model may provide visual feedback to the user about the effectiveness of the trained statistical model to accurately represent an intended handstate. Not all embodiments of system 100 include components configured to render a visual representation. For example, in some embodiments, handstate estimates output from the trained statistical model and a corresponding updated musculoskeletal representation are used to determine a state of a user's hand (e.g., in a virtual reality environment) even though a visual representation based on the updated musculoskeletal representation is not rendered (e.g., for interacting with virtual objects in a virtual environment in the absence of a virtually-rendered hand).

In some embodiments, a computer application configured to simulate a virtual reality environment may be instructed to display a visual representation of the user's hand. Positioning, movement, and/or forces applied by portions of the hand within the virtual reality environment may be displayed based on the output of the trained statistical model(s). The visual representation may be dynamically updated based on current reconstructed handstate information as continuous signals are recorded by the sensors 102 and processed by the trained statistical model(s) 104 to provide an updated computer-generated representation of the user's movement and exerted force that is updated in real-time.

As discussed above, some embodiments are directed to using a statistical model for predicting musculoskeletal information based on signals recorded from wearable autonomous sensors. The statistical model may be used to predict the musculoskeletal position information without having to place sensors on each segment of the rigid body that is to be represented in the computer-generated musculoskeletal representation. As discussed briefly above, the types of joints between segments in a multi-segment articulated rigid body model constrain movement of the rigid body. Additionally, different individuals tend to move in characteristic ways when performing a task that can be captured in statistical patterns of individual user behavior. At least some of these constraints on human body movement may be explicitly incorporated into statistical models used for prediction in accordance with some embodiments. Additionally or alternatively, the constraints may be learned by the statistical model through training based on ground truth data on the position and exerted forces of the hand and wrist in the context of recorded sensor data (e.g., EMG data). Constraints imposed in the construction of the statistical model are those set by anatomy and the physics of a user's body, while constraints derived from statistical patterns are those set by human behavior for one or more users from which sensor measurements are measured and used to train the statistical model. As described in in more detail below, the constraints may comprise part of the statistical model itself being represented by information (e.g., connection weights between nodes) in the model.

As discussed above, some embodiments are directed to using a statistical model for predicting handstate information to enable the generation and/or real-time update of a computer-based musculoskeletal representation. The statistical model may be used to predict the handstate information based on IMU signals, neuromuscular signals (e.g., EMG, MMG, and SMG signals), external device signals (e.g., camera or laser-scanning signals), or a combination of IMU signals, neuromuscular signals, and external device signals detected as a user performs one or more movements.

Figure 2:
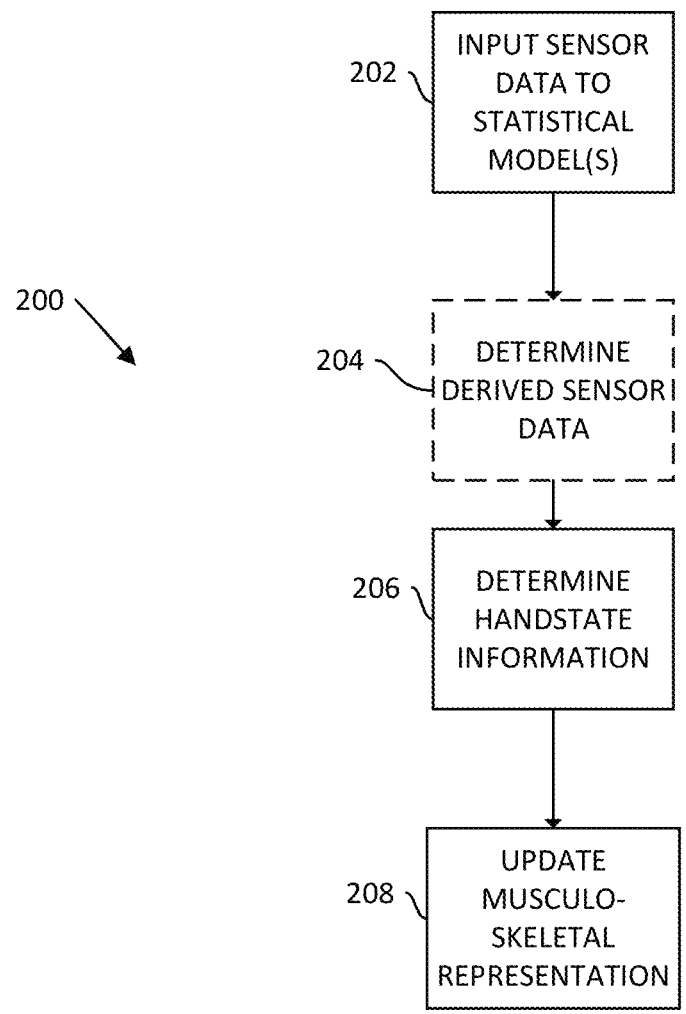
FIG. 2 is a flowchart of a process for determining handstate information in accordance with some embodiments of the technology described herein.
Figure 9A:
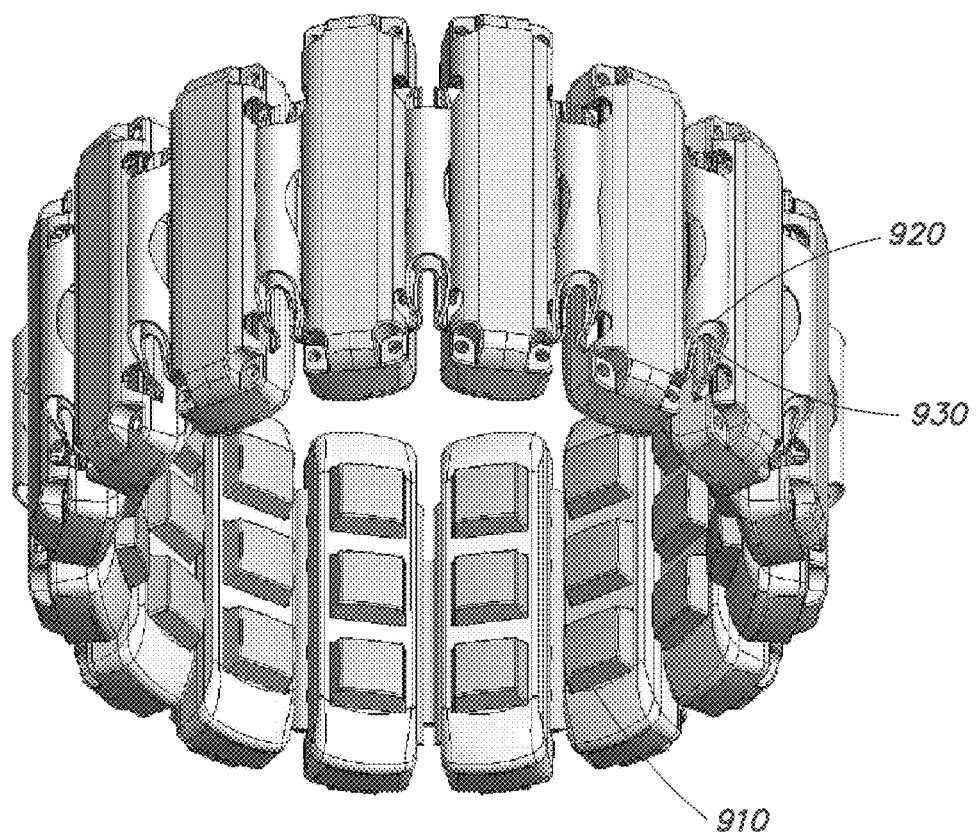
FIG. 9A illustrates a wearable system with sixteen EMG sensors arranged circumferentially around an elastic band configured to be worn around a user's lower arm or wrist, in accordance with some embodiments of the technology described herein.
Figure 9B:
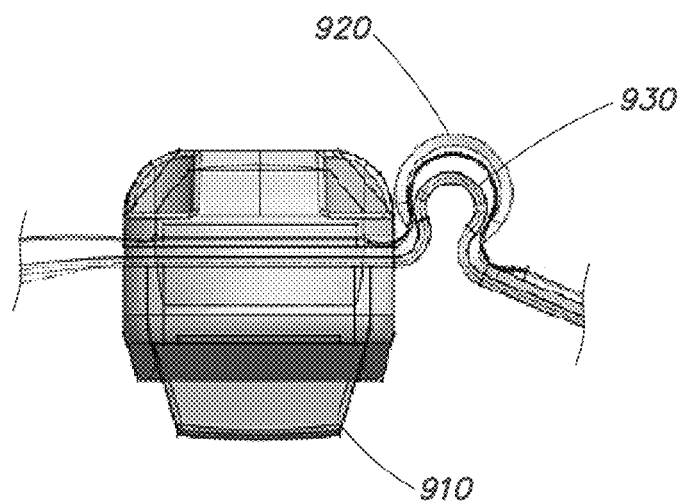
FIG. 9B is a cross-sectional view through one of the sixteen EMG sensors illustrated in FIG. 9A.

FIG. 2 illustrates a process 200 for determining handstate information based on recorded sensor data in accordance with some embodiments. In act 202, sensor data recorded by one or more sensors is provided as input to one or more trained statistical models used to generate estimates of handstate information, as described briefly above. In some embodiments, the sensors include a plurality of neuromuscular sensors (e.g., EMG sensors) arranged on a wearable device worn by a user. For example, EMG sensors may be arranged on an elastic band configured to be worn around a wrist or forearm of the user to record neuromuscular signals from the user as the user performs various movements or gestures. An example wearable device that may be used in accordance with some embodiments is shown in FIGS. 9A and 9B, which are described in more detail below.

In addition to a plurality of neuromuscular sensors, some embodiments include one or more auxiliary sensors configured to continuously record auxiliary signals that may also be provided as input to the one or more trained statistical models. Examples of auxiliary sensors include IMU sensors, imaging sensors, radiation detection devices (e.g., laser scanning devices), heart rate monitors, or any other type of biosensors configured to continuously record biophysical information from the user during performance of one or more movements or gestures.

Process 200 then proceeds to act 204, where derived signal data is optionally determined based on the signals recorded by the sensors. For example, accelerometer data recorded by one or more IMU sensors may be integrated and/or filtered to determine derived signal data associated with one or more muscles during performance of a gesture. The derived signal data may be provided as input to the trained statistical model(s) in addition to or as an alternative to raw signal data or otherwise processed raw signal data recorded by the sensors.

Process 200 then proceeds to act 206, where handstate information is determined based on the output of the trained statistical model(s). The gestures performed by the user include discrete gestures, such as placing the hand palm down on a table, and continuous gestures, such as waving a finger back and forth. The neuromuscular signals are recorded continuously during user movements including during performance of the gesture and are provided continuously as input to the trained statistical model, resulting in real-time estimation of the positions and/or forces of the user's hand (i.e., handstate information) as output of the trained statistical model(s). Process 200 then proceeds to act 208, where the real-time handstate estimates output from the trained statistical model(s) are used to update a musculoskeletal representation associated with a hand. In some embodiments, the musculoskeletal representation represents rigid segments within a hand and the joints connecting the rigid segments. In other embodiments, the musculoskeletal representation includes at least some rigid segments corresponding to an arm connected to the hand. Accordingly, the phrase "musculoskeletal representation associated with hand" should be understood to include both musculoskeletal representations of the hand and musculoskeletal representations that include a representation of the hand and at least a portion of an arm connected to the hand.

The inventors have recognized and appreciated that the handstate estimates output from the trained statistical model (s) are often imperfect and have advantages and disadvantages relative to other techniques for determining such information. For example, imaging sensors (e.g., cameras) and laser-scanning devices can provide absolute position information, but are only accurate when the interrogated body part from which the information is sought is within the field of view of the device and is not occluded. Some embodiments include multiple different types of sensors and modulate how signals from the different types of sensors are provided as input to the trained statistical model(s) based, at least in part, on confidence information associated with the signals.

Figure 11:
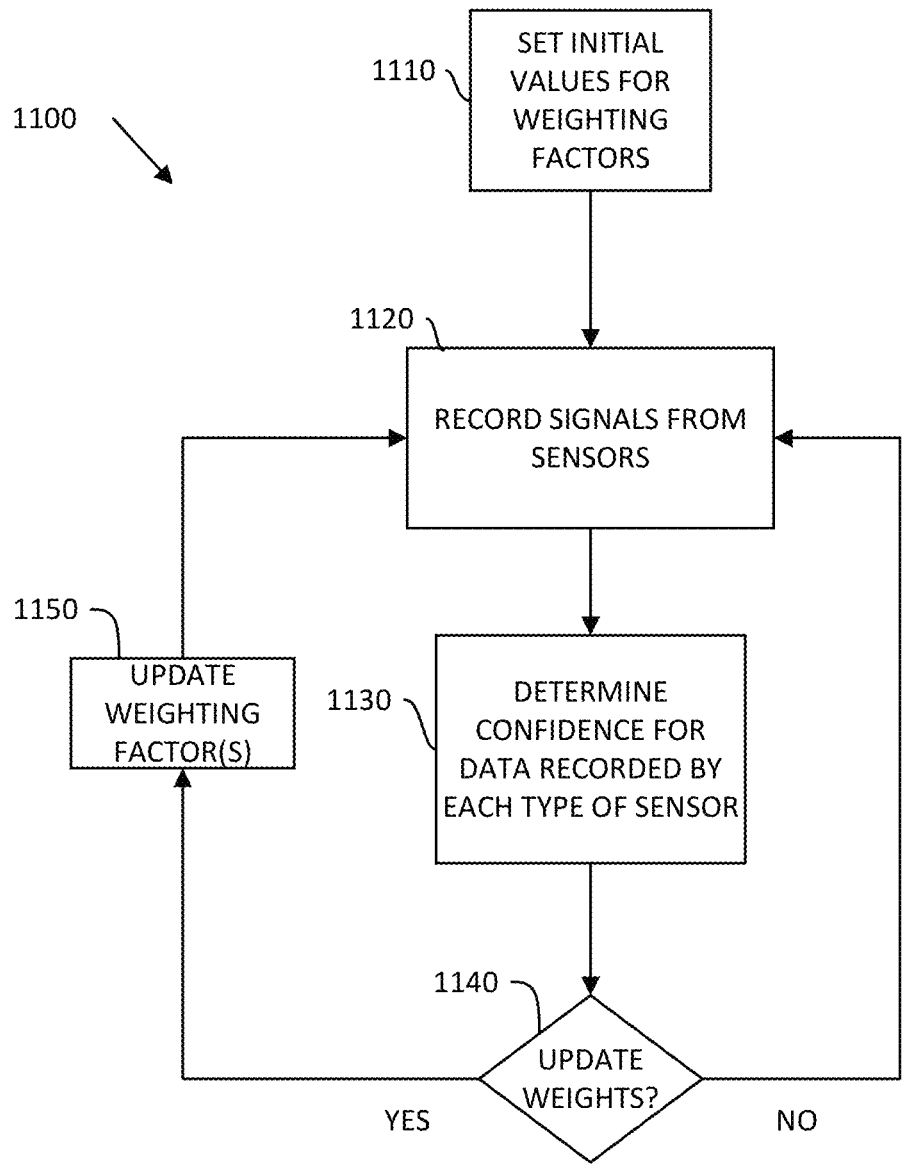
FIG. 11 is a flowchart of an illustrative process for dynamically updating weighting factors for fusing data from multiple inputs in accordance with some embodiments of the technology described herein.

For example, as discussed above, some embodiments include multiple different types of sensors (e.g., neuromuscular sensors and camera sensors). In such embodiments, the data and/or information derived from the data recorded from each of the sensor types may be weighted based, at least in part, on a determination of a confidence level for data from the sensor type. As illustrated in process 1100 of FIG. 11, in some embodiments, the weighting associated with each sensor type may change during use of the system as the confidence level determined for data from each sensor type also changes. In act 1110, initial values for weighting factors may be set for each of the different sensor types. For example, in a system with two different types of sensors, each type of sensor may be associated with an initial weighting factor value of 0.5 reflecting that the data recorded from each of the types of sensors should be weighted equally in the fused data. It should be appreciated, however, that the initial values of the weighting factors may not be the same for each of the sensor types such that the recorded data for the different sensor types is weighted differently in the fused data. For example, the initial values of the weighting factors may be set based on historical information regarding the reliability of the sensor data or using any additional or alternative information.

Process 1100 then proceeds to act 1120, where signals are recorded from the sensors, examples of which are described above. Process 1100 then proceeds to act 1130 where a confidence value associated with the recorded data from each type of sensor is determined. As described herein, non-limiting examples of determining a confidence value include determining whether there is an occluded field of view for a camera sensor and determining whether there are artifacts in recorded neuromuscular data. Process 1100 then proceeds to act 1140, where it is determined whether to update the weighting factor(s) based, at least in part, on the determined confidence values. If it is determined that the weighting factors should be updated, process 1100 proceeds to act 1150 where the weighting factors are updated. Process 1100 returns to act 1120 where the signals from the sensors are continuously recorded, with the dynamically updated weighting factors being used to fuse data recorded from the sensors.

In some embodiments, a weighting factor for each sensor type may be a value between 0 and 1 and the sum of all of the weighting factors may equal 1. For example, in a system that includes neuromuscular sensors and camera sensors, the weighting factor associated with the neuromuscular sensors may be set to 0.5 and the weighting factor associated with the camera sensors may be set to 0.5 when the field of view of the camera sensors is not occluded. However, when the field of view of the camera sensors is occluded, the weighting factor associated with the neuromuscular sensors may be set to 1 and the weighting factor associated with the camera sensors may be set to 0. Conversely, if artifacts are detected in the neuromuscular sensors, the weighting factor associated with the neuromuscular sensors may be set to 0 and the weighting factor associated with the camera sensors may be set to 1. Accordingly, when the confidence level of data from each of the plurality of sensor types is sufficiently high, the weighting of data from each sensor type may be greater than zero (though not necessarily equal) so that position and handstate information is fused from each sensor type. During use of the system, if the confidence level for data from one sensor type is low, and the confidence level for another sensor type is high, the weighting of the data for the sensor type with high confidence may approach or equal 1, whereas the weighting of the data for the sensor type with low confidence may approach or equal zero.

If the weighting of data for one sensor type equals 1, then the system may transiently enter a state wherein the data from the plurality of sensor types is no longer fused, and the estimate of handstate and/or position is fully defined by data recorded by sensors from the sensor type with high confidence. If the system enters a state in which weighting of data from one type of sensor is equal to 1, the qualitative nature of the estimate of handstate may transiently change. For example, if the data recorded by one sensor type is neuromuscular data (e.g., EMG data) and the data recorded by a second sensor type is data recorded by a fixed camera-based system, then, when the weighting of data from each of the two sensor types is greater than zero, the handstate estimate may include an estimate of: (1) wrist, hand, and finger positions as a multi-articulated rigid body, (2) force information for one or more components of the multi-articulated rigid body (e.g., joints), and (3) absolute position information of the hand and/or arm.

For an illustrative system in which one sensor type comprises a plurality of neuromuscular sensors (e.g., EMG sensors) and a second sensor type includes camera sensors in a fixed camera-based system, when the confidence level in the neuromuscular sensor type is low (e.g., due to artifacts in the neuromuscular recording), the weighting for the neuromuscular sensors may be set to 0 (or a value near 0) and the weighting for the camera sensors may be set to 1 (or a value near 1). In such a case, the handstate estimate may include (1) wrist, hand, and finger positions as a multi-articulated rigid body and (2) absolute position information of the hand and/or arm, but may not include an estimate of force information for one or more components of the multi-articulated rigid body because it may be difficult to determine force information only from data recorded by camera sensors in a fixed camera-based system. In other circumstances, when the confidence level in the fixed-camera based system is low (e.g., due to occlusion of the hand from one or more of the fixed camera sensors), the weighting associated with the camera sensors may be set to zero and the weighting associated with the neuromuscular sensors may be set to 1. In such a scenario, the handstate estimate may include (1) wrist, hand, and finger positions as a multi-articulated rigid body and (2) an estimate of force information for one or more components of the multi-articulated rigid body, but may not include absolute position information of the hand and/or arm because this information may not be confidently resolved from neuromuscular sensor data alone.

It should be appreciated that dynamic weighting of data from a plurality of sensor types for tracking a part of the human body (e.g., the hand and/or wrist), including autonomous and non-autonomous types of sensors, can be applied for any number of sensor types (e.g., three types of sensors, four types of sensors, more than four types of sensors, etc.) and that different sensor types may be configured to preferentially estimate different aspects of tracking. For example, as described above for tracking handstate, neuromuscular sensors may be configured to estimate force information with high accuracy, whereas camera-based systems are generally poor at estimating force information.

The confidence level of an estimate of position of a part of the body (e.g., of the hand and/or wrist) using a particular sensor type may be determined in any suitable way, examples of which include, but are not limited to, setting a fixed or dynamic threshold, inferring based on historical data associated with ground truth data, calculating a metric known to be associated with confidence level for a given sensor type (e.g., the velocity of movement or the user's heart rate), or any combination of the foregoing. In some embodiments, one or more models are trained to output probability distributions (e.g., by training with a cross-entropy loss), and the variance or entropy of the distribution is used as a measure of the confidence level. In other embodiments, the presence of artifacts (e.g., motion artifacts or powerline noise for EMG; or partial occlusion or uneven lighting in the case of a camera) in the recorded signals may be detected and a confidence score determined based on the presence of one or more detected artifacts. The confidence score may be determined heuristically, or by evaluating the accuracy of a single sensor model when each type of artifact is present.

In some embodiments, contextual information is used to determine a confidence level for tracking a target (e.g., a portion of a user's body) using a particular sensor type. For example, for tracking based on fixed-position cameras, the current position and velocity of the portion of the body being tracked relative to other objects in the field of view may be used to determine that the tracked portion of the body is near another object that will occlude the tracked portion of the body relative to one or more fixed cameras, and the confidence level of the camera-based tracking can be reduced (e.g., reduced by 50%, set to 0, etc.) for subsequent data received from the camera sensors. In another example, a gradually degrading signal quality for a signal recorded by a neuromuscular sensor may be associated with increasing skin temperature and sweating in a user who is physically active in a hot and humid location, causing the confidence level of that sensor type to be reduced to reflect the degrading signal quality. In yet another example, tracking of a portion of a user's body may be achieved by fusing data from a plurality of neuromuscular sensors and a fixed-camera sensor system when the user is in the field of view of the plurality of cameras (e.g., as determined via GPS, RFID, facial identification of the user via one or more of the cameras, or other location tracking technology). Weights for each of the different types of sensors may be set based on whether the one or more systems for location tracking of the user indicate the user is no longer in a location with available fixed-position cameras.

Figure 3:
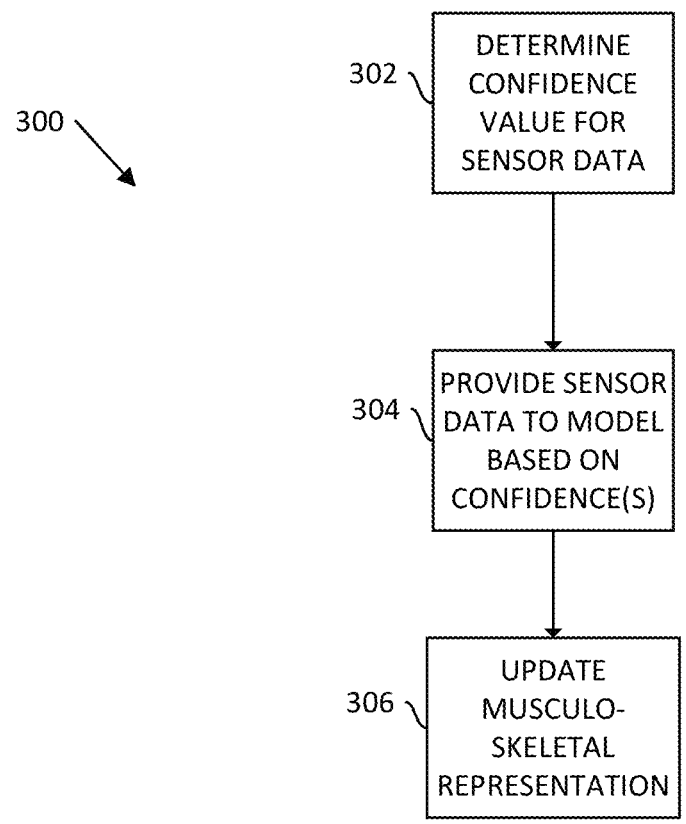
FIG. 3 is a flowchart of a process for updating a musculoskeletal representation based on a confidence determined for input signals in accordance with some embodiments of the technology described herein.

FIG. 3 illustrates a process 300 for providing sensor data to a trained statistical model based on confidence information, in accordance with some embodiments. The term "confidence" in relation to providing sensor signal data to a trained statistical model is used herein to generally refer to any assessment of the sensor signal data used to determine whether and/or how to provide the sensor signal data as input to the trained statistical model. For example, confidence information may be used to determine whether to provide as input to the trained statistical model particular signal data associated with the confidence information. Alternatively, rather than making a binary decision on whether to provide the signal data as input to the trained statistical model, some embodiments use the confidence information to weight the signal data, and weighted signal data is provided as input to the trained statistical model. Yet further embodiments are configured to use confidence information to make binary decisions on whether to provide some signal data to the trained statistical model, while also weighting other signal data using confidence information, and providing the weighted signal data to trained statistical model. In yet further embodiments, confidence information associated with the sensor data is provided together with the sensor data as input to the statistical model, where the statistical model is engineered and/or trained to interpret the confidence information.

In act 302 of process 300, confidence information is determined for the sensor data recorded by one or more of the sensors. The confidence information may be determined based on the raw signal data, derived signal data, time dynamics associated with the sensor data, a type of sensor from which the signal is recorded, a placement of the sensor relative to the sensed object, and/or any other suitable information for evaluating confidence of the sensor data. Process 300 continues in act 304, where the sensor data is provided as input to the model(s) based on the determined confidence information. The musculoskeletal model is updated in act 306 based on output of the trained statistical model.

In a virtual reality implementation, multiple sensors, each with different advantages and disadvantages may simultaneously record sensor signal data. For example, a camera mounted on glasses worn by a user may be configured to record image information about the absolute or relative position of portions of a user's hand in space such that this information does not need to be entirely inferred from other signal data (e.g., neuromuscular signals recorded by EMG sensors). A confidence associated with the signal data recorded by the camera may be determined in real-time to assess whether and/or how to provide the spatial position information recorded by a camera as input to the trained statistical model. For example, the confidence may be determined, at least in part, on the spatial arrangement of the camera's field-of-view relative to the sensed object (e.g., the user's hand). When all parts of the hand are within the camera's field of view, the confidence associated with the imaged position/orientation estimates may be high, whereas the confidence may be lower when all or a portion of the sensed object is outside of the camera's field of view. Confidence may be determined as a function of time as the user moves by performing a gesture or sequence of gestures, and the corresponding signal data recorded by the sensor may be provided as input to the model in accordance with the determined confidence.

The inventors have appreciated that some sensors are particularly good at determining spatial information about large joint angles (e.g., data recorded from IMU sensors may be used to determine the orientation of the arm relative to the hand), but are not good at determining spatial information about smaller joint angles (e.g., the orientation between the joints in the hand). Accordingly, some embodiments determine confidence of the signals recorded by the sensors based, at least in part, on the intrinsic differences between various types of sensors.

In one implementation of combining multiple inputs using a trained statistical model, the model is configured to receive multiple inputs, each of which corresponds to the signal data recorded by or derived from signal data recorded by one or more sensors. The model may also be configured to receive as input a confidence value determined for each channel of signal data provided as an input to the statistical model. Based on the model inputs including the confidence values, the model is configured to output estimates (e.g., handstate estimates), as described above.

In another implementation of combining multiple inputs using a trained statistical model, separate trained statistical models may be used to process signal data recorded by or derived from signal data recorded by each sensor. Each of the trained statistical models may be configured to output a distribution (e.g., mean and covariance) and the output distributions may be combined (e.g., using Bayesian methods) to determine estimates (e.g., handstate estimates).

In yet another implementation of combining multiple inputs using a trained statistical model, confidence information for each channel of sensor data may be independently evaluated and a determination made as to whether and/or how to provide the signal data as input to the model. That is, confidence may be used as a gating factor for providing signal data as input to the model. When a binary decision per channel is made on whether to provide the data as input to the model, the model may be configured to not require all inputs to be present to process the data and produce output estimates of position and/or force (e.g., handstate estimates). In an alternative implementation of combining multiple inputs, the trained statistical model may be configured to combine the multiple inputs using Bayesian estimates and associated uncertainties associated with the estimates, where the uncertainties associated with the estimates represent the confidence associated with the estimates.

The determination of how to provide sensor data to the model based on confidence may be implemented in any of a number of ways. For example, a set of heuristics may be used to determine whether to provide or weight signal data based on confidence. An example of this type of approach is when position information is simultaneously modeled based on neuromuscular signals recorded by neuromuscular sensors and image data captured by a camera. Due to its ability to accurately predict spatial information, the image data generally may be trusted more than the signals recorded from the neuromuscular sensors, and as such the image data may be weighted accordingly. However, when the sensed object (e.g., a hand) is out of the field-of-view of the camera, a heuristic may specify that the neuromuscular signals should be weighted more than the image data because the image data is less reliable. Additional granularity of weighting the sensor data may be used, for example, when the sensed object is only partially occluded or only partially out of the field-of-view of the camera.

Techniques for providing sensor data to the model based on confidence may be implemented in some embodiments as tunable parameters (e.g., a set of input weights) of the trained statistical model. The tuning of the parameters may be accomplished based on an analysis of the input signals, an analysis of the output of the model, in response to user input, or any combination of the foregoing. Each signal provided as input to the trained statistical model may be associated with its own confidence value or a group of signals recorded from a plurality of sensors or may be associated with a single confidence value, and embodiments are not limited in this respect.

When analyzing the input signal data, a confidence value associated with an input signal may be determined and the input may be provided (or weighted) based on whether the confidence value deviates from one or more threshold values or ranges. For example, when the confidence value is greater than a threshold value, an input weight associated with the input signal may be increased. In some implementations, the "quality" of the recorded signals may be analyzed to determine the confidence value. For example, the noisiness of the recorded signals may be determined and the confidence associated with a particular signal may be determined to be low when the signal is determined to be noisy relative to other recorded signals.

Some embodiments analyze the input signal data to determine a particular configuration of the arm and/or hand of the user and adjust tunable model parameters based on the determined configuration. For example, pronating or supinating the hand changes the relationship between signals recorded from different muscles in the arm, and different models may be used, or values for tunable model parameters of a single model may be adjusted, when the user's hand is in one of these two states. A determination of which configuration state the user's arm/hand is in may be made based on the signals recorded by any one or more sensors. In one implementation, this state determination may be provided as an input to the trained statistical model, thereby modulating the outputs of the model based on the currently detected state.

Figure 4:
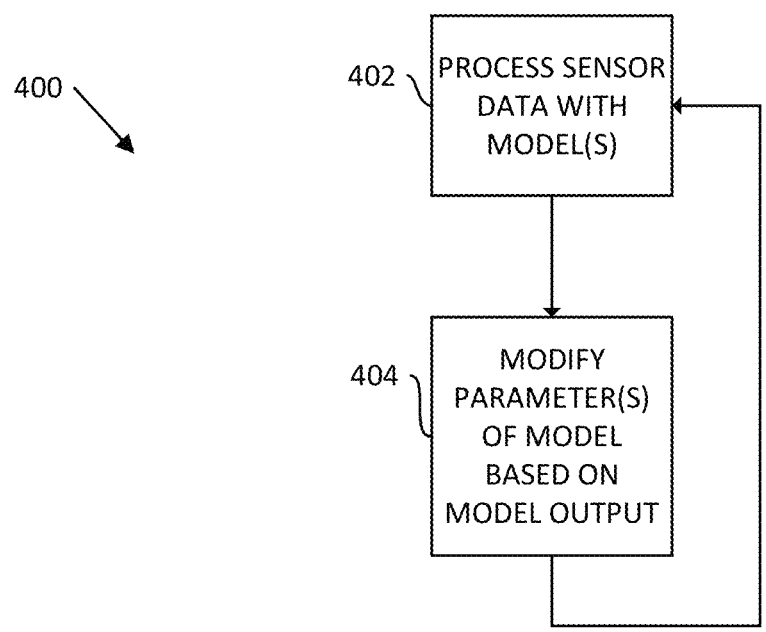
FIG. 4 is a flowchart of a process for updating a musculoskeletal representation based on a confidence determined for model estimates output from a trained statistical model in accordance with some embodiments of the technology described herein.

In some embodiments, output of the trained statistical model is used to tune one or more tunable parameters (e.g., the set of input weights) of the model to adjust which and/or how signals are provided as input to the model. FIG. 4 illustrates a process 400 for modifying parameters of a trained statistical model based on output of the model. In act 402, sensor data is processed using a trained statistical model to output estimates of handstate information given the signals input to the model. Because the model is a statistical model, the estimates output from the model are provided as probabilities with a uncertainty that may be used to modulate the tunable parameters of the model. As shown, after processing the sensor data with the model, process 400 proceeds to act 404 where one or more model parameters are modified based on the output of the model. Any suitable measure of the confidence at the output of the model may be used to modify the model parameter(s). For example, the aforementioned uncertainties may be used. Alternatively, multivariate measures of confidence such as a covariance or an entropy associated with the output of the model may be used.

In another implementation, tunable parameters of the model that determine how to combine multiple inputs in the model may be modified, based at least in part, on user input. A user interface may be provided to a user and the user may select which sensors are to be trusted more than others. For example, in an embodiment that includes both a camera device and neuromuscular sensors, the user may be able to selectively adjust the confidence associated with the imaging signal recorded by the camera when the system is used in environments in which the user has knowledge about the ability of the camera to accurately determine position information. For example, if the system is being used in a dimly-lit room the user may determine that the camera signal is likely to be less reliable and should be weighted accordingly. As an alternative to determining the confidence based on user input, the system may include one or more additional sensors (e.g., light sensors) to evaluate confidence associated with sensor data.

As another example of user input being used to tune model parameters, the system may be configured to display a rendering of a hand and/or arm based on a dynamically-updated musculoskeletal representation, which provides visual feedback to the user about the effectiveness of the model to accurately represent the user's movements. Based on this feedback, the user may provide input to the system to adjust the confidences associated with different sensors in an attempt to improve the ability of the system in producing an accurate rendered visual representation. An example of the type of visual feedback that may prompt the user to adjust tunable parameters of the model is a visual representation with reduced parameterization, discussed in more detail below. When the user identifies that the rendered visual representation has a reduced parameterization, the user may provide user input to the tuned parameters of the model in an attempt to have the system generate a rendered visual representation with a higher parameterization or increased fidelity.

In some embodiments for combining multiple inputs, each type of sensor may be processed using a statistical model trained on data from that type of sensor, and the outputs of the models may be combined based on confidences associated with the inputs provided to the models, confidences associated with outputs of the models, or any combination thereof. The confidences may be determined in accordance with one or more of the techniques described above when trained statistical model(s) configured to accept inputs from multiple types of sensors are used.

The inventors have recognized and appreciated that the estimates of forces and positions (e.g., joint angles), collectively referred to herein as handstate information, may be more accurate along some dimensions/submanifold than others. For example, predictions of a pair of fingers moving together may be more accurate than predictions of differences in movement between the pair of fingers. For some applications, a restricted model of the hand movements and forces may be sufficient for the application, and additional detail provided by a fully parameterized model may be cumbersome and unnecessary. To this end, some embodiments restrict the output of the trained statistical model to a submanifold of possible handstate information. That is, if a manifold defines a complete representational space of possible handstate information output by the trained statistical model(s), some embodiments are configured to update a musculoskeletal representation based on subspace or submanifold that defines a reduced dimensionality of the complete representational space.

Figure 5:
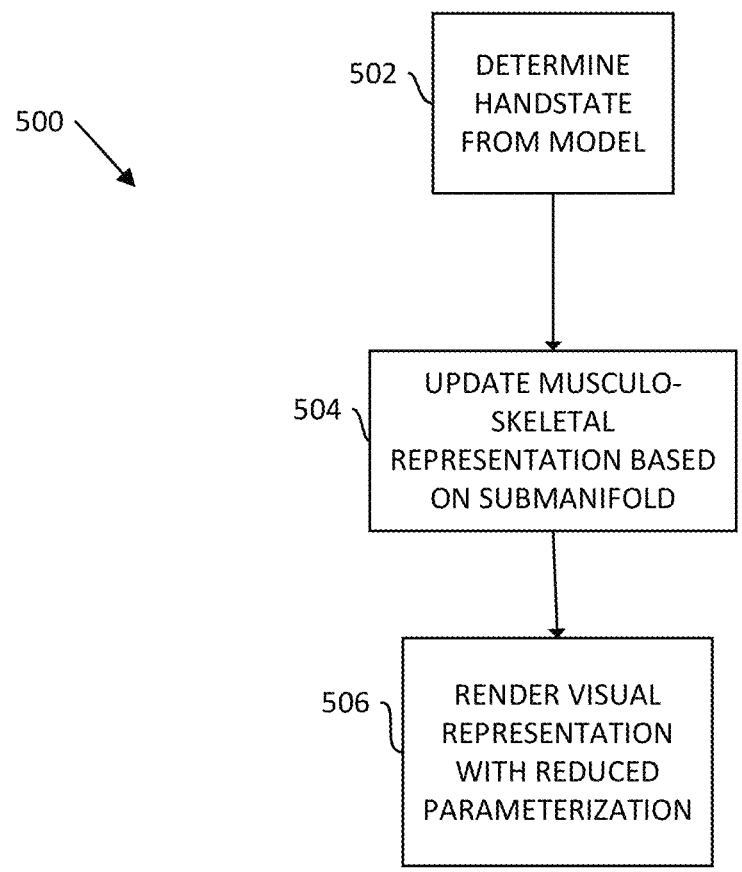
FIG. 5 is a flowchart of a process for rendering a visual representation with reduced parameterization in accordance with some embodiments of the technology described herein.

FIG. 5 illustrates a process 500 for updating a musculoskeletal representation based on a submanifold in accordance with some embodiments. In act 502, handstate information including position information and force information for a plurality of segments in the musculoskeletal representation associated with a hand is determined. Process 500 then proceeds to act 504, where the musculoskeletal model is updated based on a submanifold of the complete representational space.

As discussed above, some dimensions or degrees of freedom in the model may be captured well by the recorded signals, whereas others are captured less well. A submanifold of the complete representational space may be used to update the musculoskeletal representation in a way that captures the reliable estimates, while eliminating or de-emphasizing dimensions with less reliable estimates. The submanifold may be determined based, at least in part, on uncertainties associated with model estimates in one or more directions on the manifold. For example, when a distribution along a direction on the manifold is narrower than a threshold value, the direction on the manifold may be included in the submanifold, and not included otherwise. In some embodiments, the submanifold may be determined for a particular application in advance of runtime usage of the model. In other embodiments, the submanifold is determined dynamically as the system is used based, at least in part, on real-time handstate estimates output from the model during recording of sensor data. In yet other embodiments, the submanifold along which the estimates output from the model are restricted may be predetermined prior to runtime, with the fidelity of the rendered visual representation changing as a function of the confidence associated with dimensions on the manifold or submanifold.

After determining the submanifold to which the model estimates are to be restricted, the output of the trained statistical model is restricted to the submanifold of possible handstate estimates. In one implementation, the model outputs are parameterized such that the handstate estimates fall within the submanifold. In another implementation, the handstate estimates output from the trained statistical model are projected onto handstate estimates on the submanifold.

In some embodiments, the characteristics of the trained model itself are modified to force the output handstate estimates to fall within the submanifold. For example, the manner in which the statistical model is trained may produce a trained statistical model that outputs handstate estimates that fall within the submanifold. Training the model to restrict output of the model to fall with a submanifold may be achieved in various ways.

In some implementations, the input signals included in the training data for training the model may be restricted to correspond to user movements/gestures that fall within a desired subspace of the possible outputs of the model. Restricting the input signals may be achieved by, for example, instructing users during the training phase to restrict their movements/gestures that correspond to training data to the desired subspace corresponding to the submanifold. Alternatively, rather than instructing users to restrict their movements/gestures, users may not be provided any particular movement instructions and the input signals recorded during the movements/gestures may be analyzed to identify time intervals in which the user's activity is insufficiently close to the desired submanifold. The identified time intervals may not be included in the training data used to train the statistical model. In both of these techniques the input signals included a portion of the training data is determined to produce output estimates that fall within a desired submanifold.

During training, both input signals and ground truth data are determined to facilitate training. In particular, the input signals recorded, for example, by a plurality of neuromuscular sensors, are used as inputs to the model during training, whereas the ground truth data represents the output estimates of the model. The implementations described above for generating a trained model having characteristics that intrinsically restrict the output to a desired submanifold adjust the input signals. In an alternative implementation, the output of the model included in the training data—the ground truth data (e.g., collected using an imaging sensor)—is restricted to the desired submanifold. For example, the ground truth data may be projected onto the desired submanifold prior to inclusion in the training data used to train the model. By restricting the output of the model in this way during training, the trained statistical model will also have output restricted to the submanifold when used during runtime as a trained statistical model.

As shown, after updating the musculoskeletal representation based on the submanifold in act 504, process 500 proceeds to act 506, where a visual representation with a reduced parameterization is rendered. In some embodiments, rather than restricting the output of the trained statistical model to a submanifold as described above, the visual representation may be rendered based on a comparison of the model output (e.g., handstate estimates) to the desired submanifold. For example, a default or null model may be rendered during runtime when the dimensions represented in the output of the model is sufficiently different than the dimensionality represented in the submanifold. Alternatively, the default or null model may be rendered when the input signals are sufficiently far from those collected during training.

Examples of restricting to a submanifold that may be used in accordance with some embodiments include, but are not limited to, requiring specific fingers to move together and enforcing dependencies between joints in the musculoskeletal representation. For example, some positions/orientations (e.g., joint angles) of joints may be determined as a function of the positions/orientations of other joints such that each joint does not have independent properties (e.g., the ring and pinky fingers may have coupled movements). Another example of a restriction includes limiting the possible degrees of freedom at particular joints in the musculoskeletal representation. For example, the yaw at a particular joint (e.g., the metacarpophalangal (MCP) joint) for one or more fingers of the musculoskeletal representation may be restricted. Alternatively, the rendered visual representation may be rendered with at least one finger of the hand having fewer than a fully-specified set of joints, or having multiple joints moving together in a fixed relation.

Yet another restriction may be to estimate a small set of handstate parameters. For example, in one implementation only wrist angle, pinch between each finger and thumb, and degree of grasping (e.g., hand closed position and grasp force) may be determined. Any subset of handstate parameters may be determined, and the above-described subset is provided merely for illustration. Another possible restriction relates to modifying the rendered visual representation to show an augmented hand (e.g., having fewer or more than five fingers) to identify to the user that the output of the model has been restricted to a submanifold.

The example implementations above for representing a visual representation with a reduced parameterization focus on restrictions based on a desired submanifold of a manifold of possible model outputs or visual renderings. More generally, in some embodiments a reduced parameterization may be output based on the quality of the data assessed in real-time. The inventors have recognized and appreciated that handstate estimation quality can vary in real time due to environmental and hardware factors, such as contact issues, inactive sensors, user perspiration, positional shifts of sensors during use, etc. As a result of these factors, some fine features of the handstate estimates may lose quality while other large-scale feature may still be sufficient.

Some embodiments are directed to providing users with feedback in real-time to inform the users as to the available features/fidelity based on the quality of the input data and/or the model estimate. For example, in a virtual reality environment, the rendering of a visual representation of a hand may be changed based on a quality assessment of the data/model output to inform the user about how the rendered hand is capable of interacting with one or more virtual objects in the virtual reality environment. To this end, some embodiments include a hierarchy of musculoskeletal representations and/or visual renderings which vary in anatomical resolution. For example, if the data quality allows for grasp-wrist modeling but not for single-finger modeling, a simplified hand model may be used rather than a fully-specified hand model and the rendered visual representation may be updated accordingly.

Figure 6:
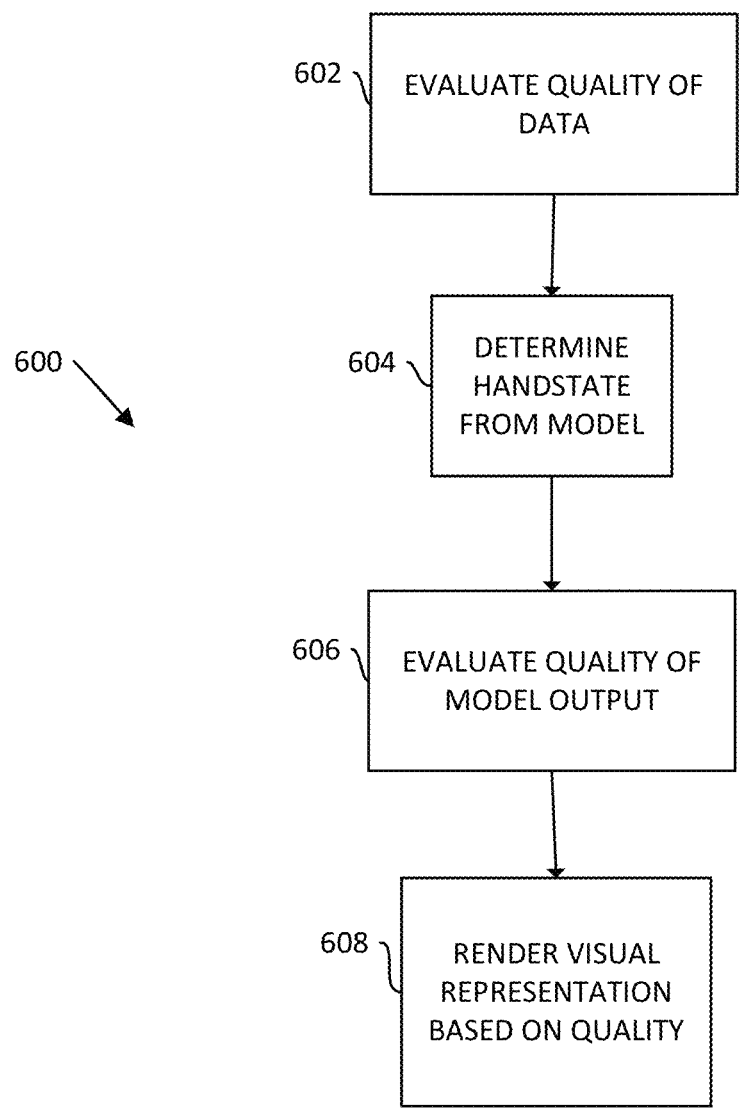
FIG. 6 is a flowchart of a process for dynamically rendering a visual representation with different fidelities in accordance with some embodiments of the technology described herein.

FIG. 6 illustrates a process 600 for rendering a visual representation based on quality in accordance with some embodiments. As shown, "quality" may be assessed at different stages of the signal processing pipeline of the system shown in FIG. 1. In some embodiments, the quality of the signals recorded by the sensors is analyzed and a selection of a trained statistical model is made based on the determined quality of the signals. In other embodiments, the same model(s) are used to process input signals and the quality of the output of the model (e.g., handstate estimates) is used to determine how to render a visual representation with a corresponding fidelity. In process 600, the quality of the sensor data is evaluated in act 602 to identify if some of the sensor data is, for example, noisy or missing resulting in a determination that the quality of the data is less than required to render a fully-specified visual representation. Depending on the quality of sensor data, a particular model with reduced dimensionality may be selected to process the input signals.

Process 600 then continues to act 604, where the model estimates (e.g., handstate estimates) are determined based on the sensor inputs. Process 600 then continues to act 606 where the quality of the model output is determined. The quality of the model output may be determined in any suitable way. Process 600 then continues to act 608, where a visual representation is rendered based on the quality determination in act 602 and/or act 606. Examples of rendering visual representations with different fidelity include, but are not limited to, rending the visual representation at a first anatomical resolution when one or more quality metrics fall below a threshold value and rending the visual representation at a second anatomical resolution when the quality metric(s) are above the threshold value, where the first anatomical resolution is less than the second anatomical resolution. An example of anatomical resolution is the degree to which multiple fingers of the hand are restricted to move together. For example, a visual representation with reduced anatomical resolution may require multiple fingers to move together, whereas a visual representation with higher anatomical resolution may allow each of the fingers to move independently. As another example, a visual representation with reduced anatomical resolution may contain fewer fingers than a visual representation with higher anatomical resolution.

As discussed above, the rendering of visualizations with different fidelities is dynamically determined in real-time to inform the user about the current performance of the model to predict handstate estimates for a fully-specified hand. The visual feedback presented to the user may prompt the user to inspect and/or adjust the hardware of the system or to change their movements in an attempt to improve the fidelity of the representation, if desired.

The inventors have recognized and appreciated that many factors may affect the relationship between recorded neuromuscular signals and the model estimates (e.g., handstate estimates) output from the trained statistical model as users use the system. Examples of some of these factors are described above, and include the sensors shifting position and/or recording poorer quality data over time. Another factor that may change the relationship between recorded neuromuscular signals and model estimates include fatigue of the user's muscles over time as a user uses the system for extended period of time. Accordingly, in some embodiments, muscle fatigue is provided as additional factor that is considered when determining model estimates. Consideration of muscle fatigue in the modeling enables the model to compensate for muscle fatigue as the user uses the system.

Figure 7:
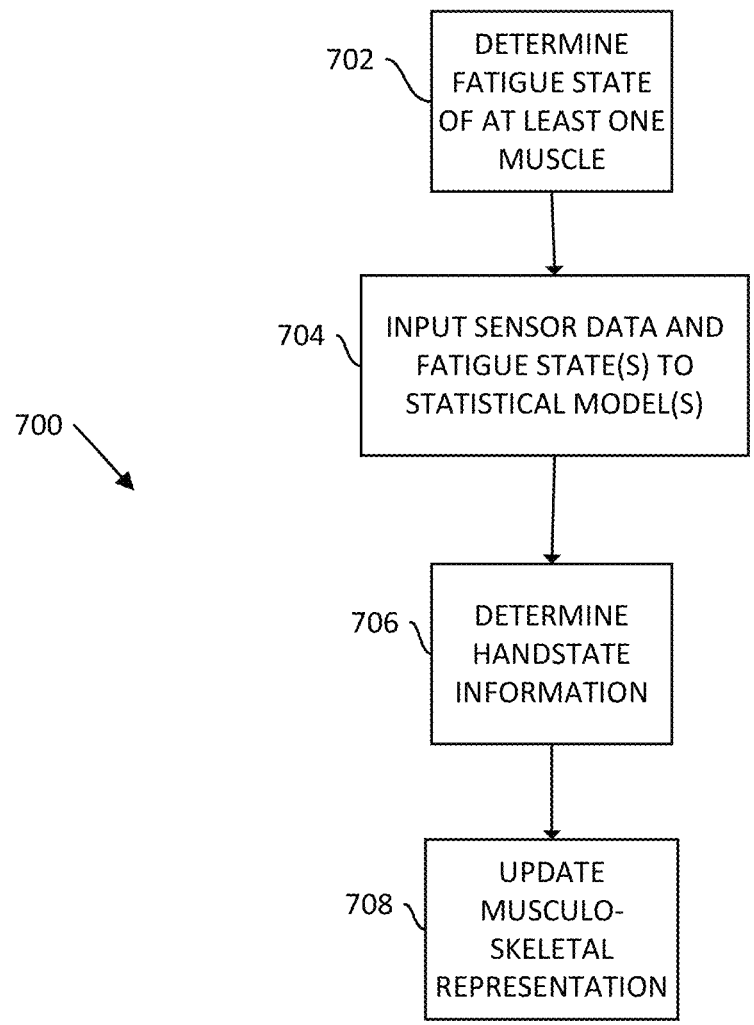
FIG. 7 is a flowchart of a process for updating a musculoskeletal representation based, at least in part, on a fatigue state of at least one muscle of a user in accordance with some embodiments of the technology described herein.

FIG. 7 illustrates a process 700 for compensating for muscle fatigue in accordance with some embodiments. In act 702, the fatigue state of at least one muscle is determined based on recorded sensor data (e.g., EMG sensor signals) and in act 704, the determined fatigue state(s) and sensor data are input to a trained statistical model. The remaining acts in process 700 are similar to those described above for FIG. 1. In act 706, model estimates (e.g. handstate estimates) are output from the model, and in act 708 a musculoskeletal representation is updated based on the output of the model.

The anatomical fidelity of the muscle fatigue state determination is not a limitation of aspects of the technology described herein. In some embodiments, the general fatigue state of the user may be assessed and provided as input to the model. In other embodiments, the fatigue state of individual muscles may be determined and provided as input to the model. In yet other embodiments, the fatigue state of individual motor units or groups of motor units may be determined and provided as input to the model.

Determining a fatigue state of at least one muscle may be achieved in any of a number of ways. As muscles become fatigued, the conduction along muscle fibers is altered, and measurement of the change in muscle fiber conduction may be used as a proxy for inferring the fatigue state of the corresponding muscle. In some embodiments, the fatigue state is determined based on an analysis of a power spectrum calculated from one or more of a plurality of neuromuscular signals recorded by the neuromuscular sensors over a particular period of time. For example, a first power spectrum calculated based on neuromuscular signals recorded from a user over a first period of time may be compared to a second power spectrum and differences between the power spectrum identified based on the comparison may be used to determine the fatigue state of the at least one muscle of the user. The second power spectrum may be calculated based on neuromuscular signals recorded during a second time period for the user, where the second time period is later in time than the first time period. Alternatively, the second power spectrum may be a "normative" power spectrum calculated based on neuromuscular signals recorded from the user or a plurality of users in a non-fatigued state.

In embodiments that compare power spectrums to determine a fatigue state of at least one muscle, a downward shift in the power spectrum exhibited in the comparison may signify that the at least one muscle is fatigued. Information about the fatigue state(s) of the muscles may be provided as additional input(s) to the trained statistical model such that muscle fatigue state is taken into consideration in generating the model output estimates.

In other embodiments, the fatigue state of the at least one muscle may be determined by extracting features from a power spectrum calculated based on neuromuscular signals and the extracted features may be provided as input to the trained statistical model.

Not all embodiments that determine a fatigue state of at least one muscle rely on the calculation of a power spectrum. For example, in some embodiments, the fatigue state of the at least one muscle may be determined based on at least one spectral feature determined directly from the neuromuscular signals. In other embodiments, the timings and/or waveforms of motor unit action potentials as represented in the neuromuscular signal data may be analyzed to determine the fatigue state of the at least one muscle.

Figure 8:
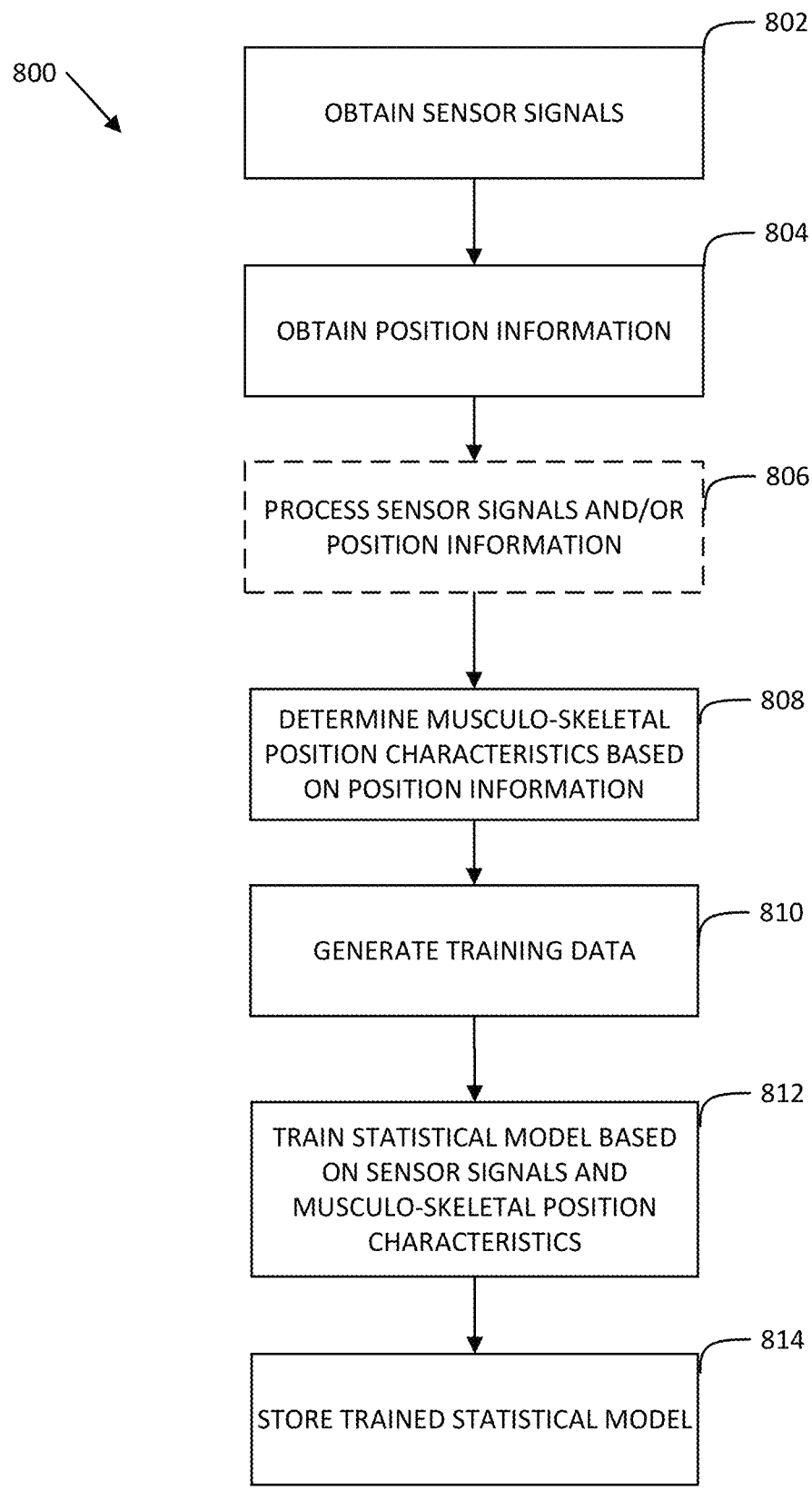
FIG. 8 is a flowchart of an illustrative process for generating a statistical model for predicting musculoskeletal position information using signals recorded from sensors, in accordance with some embodiments of the technology described herein.

FIG. 8 describes a process 800 for generating (sometimes termed "training" herein) a statistical model using signals recorded from sensors 102. Process 800 may be executed by any suitable computing device(s), as aspects of the technology described herein are not limited in this respect. For example, process 800 may be executed by one or more computer processors described with reference to FIGS. 10A and 10B. As another example, one or more acts of process 800 may be executed using one or more servers (e.g., servers included as a part of a cloud computing environment). For example, at least a portion of act 810 relating to training of a statistical model (e.g., a neural network) may be performed using a cloud computing environment.

Process 800 begins at act 802, where a plurality of sensor signals are obtained for one or multiple users performing one or more movements (e.g., typing on a keyboard). In some embodiments, the plurality of sensor signals may be recorded as part of process 800. In other embodiments, the plurality of sensor signals may have been recorded prior to the performance of process 800 and are accessed (rather than recorded) at act 802.

In some embodiments, the plurality of sensor signals may include sensor signals recorded for a single user performing a single movement or multiple movements. The user may be instructed to perform a sequence of movements for a particular task (e.g., opening a door) and sensor signals corresponding to the user's movements may be recorded as the user performs the task he/she was instructed to perform. The sensor signals may be recorded by any suitable number of sensors located in any suitable location(s) to detect the user's movements that are relevant to the task performed. For example, after a user is instructed to perform a task with the fingers of his/her right hand, the sensor signals may be recorded by multiple neuromuscular sensors circumferentially (or otherwise) arranged around the user's lower right arm to detect muscle activity in the lower right arm that give rise to the right hand movements and one or more IMU sensors arranged to predict the joint angle of the user's arm relative to the user's torso. As another example, after a user is instructed to perform a task with his/her leg (e.g., to kick an object), sensor signals may be recorded by multiple neuromuscular sensors circumferentially (or otherwise) arranged around the user's leg to detect muscle activity in the leg that give rise to the movements of the foot and one or more IMU sensors arranged to predict the joint angle of the user's leg relative to the user's torso.

In some embodiments, the sensor signals obtained in act 802 correspond to signals from one type of sensor (e.g., one or more IMU sensors or one or more neuromuscular sensors) and a statistical model may be trained based on the sensor signals recorded using the particular type of sensor, resulting in a sensor-type specific trained statistical model. For example, the obtained sensor signals may comprise a plurality of EMG sensor signals arranged around the lower arm or wrist of a user and the statistical model may be trained to predict musculoskeletal position information for movements of the wrist and/or hand during performance of a task such as grasping and twisting an object such as a doorknob.

In embodiments that provide predictions based on multiple types of sensors (e.g., IMU sensors, EMG sensors, MMG sensors, SMG sensors), a separate statistical model may be trained for each of the types of sensors and the outputs of the sensor-type specific models may be combined to generate a musculoskeletal representation of the user's body. In other embodiments, the sensor signals obtained in act 802 from two or more different types of sensors may be provided to a single statistical model that is trained based on the signals recorded from the different types of sensors. In one illustrative implementation, an IMU sensor and a plurality of EMG sensors are arranged on a wearable device configured to be worn around the forearm of a user, and signals recorded by the IMU and EMG sensors are collectively provided as inputs to a statistical model, as discussed in more detail below.

In some embodiments, the sensor signals obtained in act 802 are recorded at multiple time points as a user performs one or multiple movements. As a result, the recorded signal for each sensor may include data obtained at each of multiple time points. Assuming that n sensors are arranged to simultaneously measure the user's movement information during performance of a task, the recorded sensor signals for the user may comprise a time series of K n-dimensional vectors $\{x_k | 1 \leq k \leq K\}$ at time points $t_1, t_2, \ldots, t_K$ during performance of the movements.

In some embodiments, a user may be instructed to perform a task multiple times and the sensor signals and position information may be recorded for each of multiple repetitions of the task by the user. In some embodiments, the plurality of sensor signals may include signals recorded for multiple users, each of the multiple users performing the same task one or more times. Each of the multiple users may be instructed to perform the task and sensor signals and position information corresponding to that user's movements may be recorded as the user performs (once or repeatedly) the task he/she was instructed to perform. When sensor signals are collected by multiple users which are combined to generate a statistical model, an assumption is that different users employ similar musculoskeletal positions to perform the same movements. Collecting sensor signals and position information from a single user performing the same task repeatedly and/or from multiple users performing the same task one or multiple times facilitates the collection of sufficient training data to generate a statistical model that can accurately predict musculoskeletal position information associated with performance of the task.

In some embodiments, a user-independent statistical model may be generated based on training data corresponding to the recorded signals from multiple users, and as the system is used by a user, the statistical model is trained based on recorded sensor data such that the statistical model learns the user-dependent characteristics to refine the prediction capabilities of the system for the particular user.

In some embodiments, the plurality of sensor signals may include signals recorded for a user (or each of multiple users) performing each of multiple tasks one or multiple times. For example, a user may be instructed to perform each of multiple tasks (e.g., grasping an object, pushing an object, and pulling open a door) and signals corresponding to the user's movements may be recorded as the user performs each of the multiple tasks he/she was instructed to perform. Collecting such data may facilitate developing a statistical model for predicting musculoskeletal position information associated with multiple different actions that may be taken by the user. For example, training data that incorporates musculoskeletal position information for multiple actions may facilitate generating a statistical model for predicting which of multiple possible movements a user may be performing.

As discussed above, the sensor data obtained at act 802 may be obtained by recording sensor signals as each of one or multiple users performs each of one or more tasks one or more multiple times. As the user(s) perform the task(s), position information describing the spatial position of different body segments during performance of the task(s) may be obtained in act 804. In some embodiments, the position information is obtained using one or more external devices or systems that track the position of different points on the body during performance of a task. For example, a motion capture system, a laser scanner, a device to measure mutual magnetic induction, or some other system configured to capture position information may be used. As one non-limiting example, a plurality of position sensors may be placed on segments of the fingers of the right hand and a motion capture system may be used to determine the spatial location of each of the position sensors as the user performs a task such as grasping an object. The sensor data obtained at act 802 may be recorded simultaneously with recording of the position information obtained in act 804. In this example, position information indicating the position of each finger segment over time as the grasping motion is performed is obtained.

Next, process 800 proceeds to act 806, where the sensor signals obtained in act 802 and/or the position information obtained in act 804 are optionally processed. For example, the sensor signals or the position information signals may be processed using amplification, filtering, rectification, or other types of signal processing.

Next, process 800 proceeds to act 808, where musculoskeletal position characteristics are determined based on the position information (as collected in act 804 or as processed in act 806). In some embodiments, rather than using recorded spatial (e.g., x, y, z) coordinates corresponding to the position sensors as training data to train the statistical model, a set of derived musculoskeletal position characteristic values are determined based on the recorded position information, and the derived values are used as training data for training the statistical model. For example, using information about the constraints between connected pairs of rigid segments in the articulated rigid body model, the position information may be used to determine joint angles that define angles between each connected pair of rigid segments at each of multiple time points during performance of a task. Accordingly, the position information obtained in act 804 may be represented by a vector of n joint angles at each of a plurality of time points, where n is the number of joints or connections between segments in the articulated rigid body model.

Next, process 800 proceeds to act 810, where the time series information obtained at acts 802 and 808 is combined to create training data used for training a statistical model at act 810. The obtained data may be combined in any suitable way. In some embodiments, each of the sensor signals obtained at act 802 may be associated with a task or movement within a task corresponding to the musculoskeletal position characteristics (e.g., joint angles) determined based on the positional information recorded in act 804 as the user performed the task or movement. In this way, the sensor signals may be associated with musculoskeletal position characteristics (e.g., joint angles) and the statistical model may be trained to predict that the musculoskeletal representation will be characterized by particular musculoskeletal position characteristics between different body segments when particular sensor signals are recorded during performance of a particular task.

In embodiments comprising sensors of different types (e.g., IMU sensors and neuromuscular sensors) configured to simultaneously record different types of movement information during performance of a task, the sensor data for the different types of sensors may be recorded using the same or different sampling rates. When the sensor data is recorded at different sampling rates, at least some of the sensor data may be resampled (e.g., up-sampled or down-sampled) such that all sensor data provided as input to the statistical model corresponds to time series data at the same time resolution. Resampling at least some of the sensor data may be performed in any suitable way including, but not limited to using interpolation for upsampling and using decimation for downsampling.

In addition to or as an alternative to resampling at least some of the sensor data when recorded at different sampling rates, some embodiments employ a statistical model configured to accept multiple inputs asynchronously. For example, the statistical model may be configured to model the distribution of the "missing" values in the input data having a lower sampling rate. Alternatively, the timing of training of the statistical model occur asynchronously as input from multiple sensor data measurements becomes available as training data.

Next, process 800 proceeds to act 812, where a statistical model for predicting musculoskeletal position information is trained using the training data generated at act 810. The statistical model being trained may take as input a sequence of data sets each of the data sets in the sequence comprising an n-dimensional vector of sensor data. The statistical model may provide output that indicates, for each of one or more tasks or movements that may be performed by a user, the likelihood that the musculoskeletal representation of the user's body will be characterized by a set of musculoskeletal position characteristics (e.g., a set of joint angles between segments in an articulated multi-segment body model). For example, the statistical model may take as input a sequence of vectors $\{x_k | 1 \le k \le K\}$ generated using measurements obtained at time points $t_1, t_2, \ldots t_K$, where the ith component of vector $x_j$ is a value measured by the ith sensor at time $t_3$ and/or derived from the value measured by the ith sensor at time $t_j$. In another non-limiting example, a derived value provided as input to the statistical model may comprise features extracted from the data from all or a subset of the sensors at and/or prior to time $t_j$ (e.g., a covariance matrix, a power spectrum, a combination thereof, or any other suitable derived representation). Based on such input, the statistical model may provide output indicating, a probability that a musculoskeletal representation of the user's body will be characterized by a set of musculoskeletal position characteristics. As one non-limiting example, the statistical model may be trained to predict a set of joint angles for segments in the fingers in the hand over time as a user grasps an object. In this example, the trained statistical model may output, a set of predicted joint angles for joints in the hand corresponding to the sensor input.

In some embodiments, the statistical model may be a neural network and, for example, may be a recurrent neural network. In some embodiments, the recurrent neural network may be a long short-term memory (LSTM) neural network. It should be appreciated, however, that the recurrent neural network is not limited to being an LSTM neural network and may have any other suitable architecture. For example, in some embodiments, the recurrent neural network may be a fully recurrent neural network, a recursive neural network, a variational autoencoder, a Hopfield neural network, an associative memory neural network, an Elman neural network, a Jordan neural network, an echo state neural network, a second order recurrent neural network, and/or any other suitable type of recurrent neural network. In other embodiments, neural networks that are not recurrent neural networks may be used. For example, deep neural networks, convolutional neural networks, and/or feedforward neural networks, may be used.

In some of the embodiments in which the statistical model is a neural network, the output layer of the neural network may provide a set of output values corresponding to a respective set of possible musculoskeletal position characteristics (e.g., joint angles). In this way, the neural network may operate as a non-linear regression model configured to predict musculoskeletal position characteristics from raw or pre-processed sensor measurements. It should be appreciated that, in some embodiments, any other suitable non-linear regression model may be used instead of a neural network, as aspects of the technology described herein are not limited in this respect.

In some embodiments, the neural network can be implemented based on a variety of topologies and/or architectures including deep neural networks with fully connected (dense) layers, Long Short-Term Memory (LSTM) layers, convolutional layers, Temporal Convolutional Layers (TCL), or other suitable type of deep neural network topology and/or architecture. The neural network can have different types of output layers including output layers with logistic sigmoid activation functions, hyperbolic tangent activation functions, linear units, rectified linear units, or other suitable type of nonlinear unit. Likewise, the neural network can be configured to represent the probability distribution over n different classes via, for example, a softmax function or include an output layer that provides a parameterized distribution e.g., mean and variance of a Gaussian distribution.

It should be appreciated that aspects of the technology described herein are not limited to using neural networks, as other types of statistical models may be employed in some embodiments. For example, in some embodiments, the statistical model may comprise a hidden Markov model, a Markov switching model with the switching allowing for toggling among different dynamic systems, dynamic Bayesian networks, and/or any other suitable graphical model having a temporal component. Any such statistical model may be trained at act 812 using the sensor data obtained at act 802.

As another example, in some embodiments, the statistical model may take as input, features derived from the sensor data obtained at act 802. In such embodiments, the statistical model may be trained at act 812 using features extracted from the sensor data obtained at act 802. The statistical model may be a support vector machine, a Gaussian mixture model, a regression based classifier, a decision tree classifier, a Bayesian classifier, and/or any other suitable classifier, as aspects of the technology described herein are not limited in this respect. Input features to be provided as training data to the statistical model may be derived from the sensor data obtained at act 802 in any suitable way. For example, the sensor data may be analyzed as time series data using wavelet analysis techniques (e.g., continuous wavelet transform, discrete-time wavelet transform, etc.), Fourier-analytic techniques (e.g., short-time Fourier transform, Fourier transform, etc.), and/or any other suitable type of time-frequency analysis technique. As one non-limiting example, the sensor data may be transformed using a wavelet transform and the resulting wavelet coefficients may be provided as inputs to the statistical model.

In some embodiments, at act 812, values for parameters of the statistical model may be estimated from the training data generated at act 810. For example, when the statistical model is a neural network, parameters of the neural network (e.g., weights) may be estimated from the training data. In some embodiments, parameters of the statistical model may be estimated using gradient descent, stochastic gradient descent, and/or any other suitable iterative optimization technique. In embodiments where the statistical model is a recurrent neural network (e.g., an LSTM), the statistical model may be trained using stochastic gradient descent and backpropagation through time. The training may employ a cross-entropy loss function and/or any other suitable loss function, as aspects of the technology described herein are not limited in this respect.

Next, process 800 proceeds to act 814, where the trained statistical model is stored (e.g., in datastore—not shown). The trained statistical model may be stored using any suitable format, as aspects of the technology described herein are not limited in this respect. In this way, the statistical model generated during execution of process 800 may be used at a later time, for example, to predict musculoskeletal position information (e.g., joint angles) for a given set of input sensor data, as described below.

In some embodiments, sensor signals are recorded from a plurality of sensors (e.g., arranged on or near the surface of a user's body) that record activity associated with movements of the body during performance of a task. The recorded signals may be optionally processed and provided as input to a statistical model trained using one or more techniques described above in connection with FIG. 8. In some embodiments that continuously record autonomous signals, the continuously recorded signals (raw or processed) may be continuously or periodically provided as input to the trained statistical model for prediction of musculoskeletal position information (e.g., joint angles) for the given set of input sensor data. As discussed above, in some embodiments, the trained statistical model is a user-independent model trained based on autonomous sensor and position information measurements from a plurality of users. In other embodiments, the trained model is a user-dependent model trained on data recorded from the individual user from which the data associated with the sensor signals is also acquired.

After the trained statistical model receives the sensor data as a set of input parameters, the predicted musculoskeletal position information is output from the trained statistical model. As discussed above, in some embodiments, the predicted musculoskeletal position information may comprise a set of musculoskeletal position information values (e.g., a set of joint angles) for a multi-segment articulated rigid body model representing at least a portion of the user's body. In other embodiments, the musculoskeletal position information may comprise a set of probabilities that the user is performing one or more movements from a set of possible movements.

In some embodiments, after musculoskeletal position information is predicted, a computer-based musculoskeletal representation of the user's body is generated based, at least in part, on the musculoskeletal position information output from the trained statistical model. The computer-based musculoskeletal representation may be generated in any suitable way. For example, a computer-based musculoskeletal model of the human body may include multiple rigid body segments, each of which corresponds to one or more skeletal structures in the body. For example, the upper arm may be represented by a first rigid body segment, the lower arm may be represented by a second rigid body segment the palm of the hand may be represented by a third rigid body segment, and each of the fingers on the hand may be represented by at least one rigid body segment (e.g., at least fourth-eighth rigid body segments). A set of joint angles between connected rigid body segments in the musculoskeletal model may define the orientation of each of the connected rigid body segments relative to each other and a reference frame, such as the torso of the body. As new sensor data is measured and processed by the statistical model to provide new predictions of the musculoskeletal position information (e.g., an updated set of joint angles), the computer-based musculoskeletal representation of the user's body may be updated based on the updated set of joint angles determined based on the output of the statistical model. In this way the computer-based musculoskeletal representation is dynamically updated in real-time as sensor data is continuously recorded.

The computer-based musculoskeletal representation may be represented and stored in any suitable way, as embodiments of the technology described herein are not limited with regard to the particular manner in which the representation is stored. Additionally, although referred to herein as a "musculoskeletal" representation, to reflect that muscle activity may be associated with the representation in some embodiments, as discussed in more detail below, it should be appreciated that some musculoskeletal representations used in accordance with some embodiments may correspond to skeletal structures, muscular structures or a combination of skeletal structures and muscular structures in the body.

In some embodiments, direct measurement of neuromuscular activity and/or muscle activity underlying the user's movements may be combined with the generated musculoskeletal representation. Measurements from a plurality of sensors placed at locations on a user's body may be used to create a unified representation of muscle recruitment by superimposing the measurements onto a dynamically-posed skeleton. In some embodiments, muscle activity sensed by neuromuscular sensors and/or information derived from the muscle activity (e.g., force information) may be combined with the computer-generated musculoskeletal representation in real time.

FIG. 9A illustrates a wearable system with sixteen neuromuscular sensors 910 (e.g., EMG sensors) arranged circumferentially around an elastic band 920 configured to be worn around a user's lower arm or wrist. As shown, EMG sensors 910 are arranged circumferentially around elastic band 920. It should be appreciated that any suitable number of neuromuscular sensors may be used. The number and arrangement of neuromuscular sensors may depend on the particular application for which the wearable device is used. For example, a wearable armband or wristband can be used to generate control information for controlling an augmented reality system, a robot, controlling a vehicle, scrolling through text, controlling a virtual avatar, or any other suitable control task.

In some embodiments, sensors 910 includes a set of neuromuscular sensors (e.g., EMG sensors). In other embodiments, sensors 910 can include a set of neuromuscular sensors and at least one "auxiliary" sensor configured to continuously record auxiliary signals. Examples of auxiliary sensors include, but are not limited to, other sensors such as IMU sensors, microphones, imaging sensors (e.g., a camera), radiation based sensors for use with a radiation-generation device (e.g., a laser-scanning device), or other types of sensors such as a heart-rate monitor. As shown the sensors 910 may be coupled together using flexible electronics 930 incorporated into the wearable device. FIG. 9B illustrates a cross-sectional view through one of the sensors 910 of the wearable device shown in FIG. 9A.

In some embodiments, the output of one or more of the sensing components can be optionally processed using hardware signal processing circuitry (e.g., to perform amplification, filtering, and/or rectification). In other embodiments, at least some signal processing of the output of the sensing components can be performed in software. Thus, signal processing of signals sampled by the sensors can be performed in hardware, software, or by any suitable combination of hardware and software, as aspects of the technology described herein are not limited in this respect. A non-limiting example of a signal processing chain used to process recorded data from sensors 910 are discussed in more detail below in connection with FIGS. 10A and 10B.

FIGS. 10A and 10B illustrate a schematic diagram with internal components of a wearable system with sixteen EMG sensors, in accordance with some embodiments of the technology described herein. As shown, the wearable system includes a wearable portion 1010 (FIG. 10A) and a dongle portion 1020 (FIG. 10B) in communication with the wearable portion 1010 (e.g., via Bluetooth or another suitable short range wireless communication technology). As shown in FIG. 10A, the wearable portion 1010 includes the sensors 910, examples of which are described in connection with FIGS. 9A and 9B. The output of the sensors 910 is provided to analog front end 1030 configured to perform analog processing (e.g., noise reduction, filtering, etc.) on the recorded signals. The processed analog signals are then provided to analog-to-digital converter 1032, which converts the analog signals to digital signals that can be processed by one or more computer processors. An example of a computer processor that may be used in accordance with some embodiments is microcontroller (MCU) 1034 illustrated in FIG. 10A. As shown, MCU 1034 may also include inputs from other sensors (e.g., IMU sensor 1040), and power and battery module 1042. The output of the processing performed by MCU may be provided to antenna 1050 for transmission to dongle portion 1020 shown in FIG. 10B.

Dongle portion 1020 includes antenna 1052 configured to communicate with antenna 1050 included as part of wearable portion 1010. Communication between antenna 1050 and 1052 may occur using any suitable wireless technology and protocol, non-limiting examples of which include radiofrequency signaling and Bluetooth. As shown, the signals received by antenna 1052 of dongle portion 1020 may be provided to a host computer for further processing, display, and/or for effecting control of a particular physical or virtual object or objects.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer-readable storage medium (e.g., a computer memory, a portable memory, a compact disk, etc.) encoded with a computer program (i.e., a plurality of instructions), which, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of which an example has been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A computerized system for providing a real-time musculoskeletal representation associated with an arm or hand of a user, the system comprising:
   a plurality of sensors including:
      a plurality of neuromuscular sensors arranged on one or more wearable devices and configured to record a plurality of neuromuscular signals from the user; and
      one or more auxiliary sensors configured to record one or more auxiliary signals associated with arm or hand movements of the user, wherein the one or more auxiliary sensors comprise at least one imaging sensor configured to capture one or more images of at least a portion of the arm and/or the hand of the user; and
   at least one computer processor programmed to:
      provide, as input to a trained statistical model, the plurality of neuromuscular signals and the one or more auxiliary signals;
      provide, as a constraint used by the trained statistical model, a prior state of the musculoskeletal representation, wherein:
         the musculoskeletal representation includes a plurality of connected segments, each of which corresponding to one or more skeletal structures in the arm or hand of the user;
         the prior state of the musculoskeletal representation comprises a first set of joint angles describing a spatial relationship between two or more of the plurality of connected segments; and
         the prior state of the musculoskeletal representation limits probabilities of possible subsequent states of the musculoskeletal representation;
      determine, using the trained statistical model, updated position information and updated force information for the musculoskeletal representation, wherein:
         the updated position information comprises a second set of joint angles describing the spatial relationship between the two or more of the plurality of connected segments, and
         the updated force information comprises inferred force estimates describing a force exerted by at least one segment of the musculoskeletal representation; and
      update the musculoskeletal representation based, at least in part, on the updated position information and the updated force information.

2. The computerized system of claim 1, wherein the musculoskeletal representation includes at least one segment corresponding to the arm connected to the hand.

3. The computerized system of claim 1, wherein:
   the updated force information includes a linear force exerted by the at least one segment;
   the linear force is determined based at least in part on the plurality of neuromuscular signals and constrained by the prior state of the musculoskeletal representation.

4. The computerized system of claim 1, wherein:
   the updated force information includes a torque exerted by the at least one segment;
   the torque is determined based at least in part on the plurality of neuromuscular signals and constrained by the prior state of the musculoskeletal representation.

5. The computerized system of claim 1, wherein the updated force information comprises a magnitude of a pinching force, a magnitude of a grasping force, or magnitudes of co-contraction forces.

6. The computerized system of claim 1, wherein the one or more auxiliary sensors further comprise at least one inertial measurement unit (IMU) sensor configured to record IMU signals.

7. The computerized system of claim 1, wherein the one or more auxiliary sensors further comprise a radiation-based sensor configured to detect when radiation is incident on the sensor.

8. The computerized system of claim 1, wherein the plurality of neuromuscular sensors comprise electromyography (EMG) sensors, mechanomyography (MMG) sensors, sonomyography (SMG) sensors, or a combination of two or more of EMG, MMG and SMG sensors.

9. The computerized system of claim 1, wherein the plurality of neuromuscular sensors are configured to record the plurality of neuromuscular signals at a first sampling rate and the one or more auxiliary sensors is/are configured to record the one or more auxiliary signals at a second sampling rate, wherein the first sampling rate and second sampling rate are different, and
wherein
(1) at least one of the plurality of neuromuscular signals or the one or more auxiliary signals are resampled such that the plurality of neuromuscular signals and the one or more auxiliary signals are provided as input to the trained statistical model at a same rate;
(2) the trained statistical model is configured to process asynchronous inputs; or
(3) the trained statistical model comprises:
a first trained statistical model configured to receive as input the plurality of neuromuscular signals at the first sampling rate;
a second trained statistical model configured to receive as input the one or more auxiliary signals at the second sampling rate; and
a combiner configured to combine outputs of the first trained statistical model and the second trained statistical model to provide the the updated position information and the updated force information.

10. The computerized system of claim 1, wherein the at least one computer processor is further programmed to:
weight the plurality of neuromuscular signals, the one or more auxiliary signals, or the plurality of neuromuscular signals and the one or more auxiliary signals, wherein the weighting is based on a confidence associated with the plurality of neuromuscular signals and/or a confidence associated with the one or more auxiliary signals.

11. The computerized system of claim 10, wherein the at least one computer processor is further programmed to:
determine a first confidence value associated with the one or more auxiliary signals; and
provide, as input to the trained statistical model, the one or more auxiliary signals when the first confidence value is greater than a first threshold value.

12. The computerized system of claim 11, wherein determining the first confidence value comprises determining the first confidence value based, at least in part, on whether the hand of the user is fully or partially occluded in the one or more images.

13. The computerized system of claim 12, wherein the at least one computer processor is further programmed to:
determine a second confidence value associated with the plurality of neuromuscular signals; and
provide, as input to the trained statistical model, the plurality of neuromuscular signals when the second confidence value is greater than a second threshold value.

14. The computerized system of claim 13, wherein the at least one computer processor is further programmed to provide, as input to the trained statistical model, the one or more auxiliary signals and the plurality of neuromuscular signals when the first confidence value is greater than the first threshold value and the second confidence value is greater than the second threshold value.

15. The computerized system of claim 1, wherein the at least one computer processor is further programmed to modify at least one parameter of the trained statistical model based, at least in part, on the updated musculoskeletal representation.

16. The computerized system of claim 1, wherein the at least one computer processor is further programmed to update one or more of the plurality of connected segments of the musculoskeletal representation based on the user's specific hand geometry or arm geometry.

17. The computerized system of claim 1, wherein the at least one computer processor is further programmed to:
determine, based on the one or more images, a length of the one or more skeletal structures in the arm or hand of the user;
update, based on the length of the one or more skeletal structures, a length of a corresponding one of the plurality of connected segments.

18. The computerized system of claim 1, wherein:
the updated position information is determined using the one or more auxiliary signals;
the prior state of the musculoskeletal representation limits probabilities of possible joint angles predicted by the trained statistical model;
the updated force information is determined using the plurality of neuromuscular signals from the user; and
the prior state of the musculoskeletal representation limits probabilities of possible magnitudes of the force predicted by the trained statistical model.

19. The computerized system of claim 1, wherein the plurality of neuromuscular sensors and the one or more auxiliary sensors are arranged on a same wearable device.

20. The computerized system of claim 1, wherein the at least one computer processor is further programmed to:
determine derived information based on the plurality of neuromuscular signals and/or the one or more auxiliary signals, and
provide the derived information as input to the trained statistical model.

21. The computerized system of claim 20, wherein the derived information comprises derived force information.

22. The computerized system of claim 1, wherein:
a manifold defines a complete representational space of possible position information and force information output by the trained statistical model; and
determining the updated position information and the updated force information comprises using the prior state of the musculoskeletal representation to identify a submanifold of the manifold, wherein the submanifold defines a reduced dimensionality of the complete representational space.

23. The computerized system of claim 22, wherein determining the updated position information and the updated force information comprises parameterizing the updated position information and the updated force information such that the updated position and/or force information falls within the submanifold.

24. The computerized system of claim 22, wherein determining the updated position information and the updated force information comprises projecting the updated position information and/or the updated force information onto the submanifold.

25. The computerized system of claim 1, wherein the one or more auxiliary signals is/are selected from the group consisting of positions, accelerations, forces, and angular rotations associated with the arm or hand movements of the user.

26. The computerized system of claim 1, wherein the at least one computer processor is further programmed to determine, based on the updated position information and the updated force information, absolute position information in space.

27. The computerized system of claim 26, wherein the absolute position information comprises a position of the portion of the arm and/or the hand relative to an object in proximity to the user.

28. The computerized system of claim 26, wherein the absolute position information comprises a position of the portion of the arm and/or the hand relative to a torso of the user.

29. A method of providing a real-time musculoskeletal representation associated with an arm or hand of a user, the method comprising:
 recording:
  a plurality of neuromuscular signals from the user using a plurality of neuromuscular sensors arranged on one or more wearable devices worn by the user; and
  one or more auxiliary signals associated with arm or hand movements of the user using one or more auxiliary sensors, wherein the one or more auxiliary signals are selected from the group consisting of positions, accelerations, forces, and angular rotations associated with the arm or hand movements of the user, wherein the one or more auxiliary sensors comprise at least one imaging sensor configured to capture one or more images of at least a portion of the arm and/or the hand of the user;
 providing, as input to a trained statistical model, the plurality of neuromuscular signals and the one or more auxiliary signals;
 provide, as a constraint used by the trained statistical model, a prior state of the musculoskeletal representation, wherein:
  the musculoskeletal representation includes a plurality of connected segments, each of which corresponding to one or more skeletal structures in the arm or hand of the user;
  the prior state of the musculoskeletal representation comprises a first set of joint angles describing a spatial relationship between two or more of the plurality of connected segments; and
  the prior state of the musculoskeletal representation limits probabilities of possible subsequent states of the musculoskeletal representation;
 determining, using the trained statistical model and at least one computer processor, updated position information and updated force information for the musculoskeletal representation, wherein:
  the updated position information comprises a second set of joint angles describing the spatial relationship between the two or more of the plurality of connected segments, and
  the updated force information comprises inferred force estimates describing a force exerted by at least one segment of the musculoskeletal representation; and
 updating the musculoskeletal representation based, at least in part, on the updated position information and the updated force information.

* * * * *

UNITED STATES PATENT AND TRADEMARK OFFICE
CERTIFICATE OF CORRECTION

PATENT NO. : 10,817,795 B2  
APPLICATION NO. : 16/257922  
DATED : October 27, 2020  
INVENTOR(S) : Patrick Kaifosh et al.

Page 1 of 1

It is certified that error appears in the above-identified patent and that said Letters Patent is hereby corrected as shown below:

In the Claims

In Column 39, Claim 9, Line 41, after "provide" delete "the".

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*